US012680844B2

(12) United States Patent
Robinson et al.

(10) Patent No.: US 12,680,844 B2
(45) Date of Patent: Jul. 14, 2026

(54) DEVICES AND METHODS FOR ROTARY ENCODER CALIBRATION

(71) Applicant: WAYMO LLC, Mountain View, CA (US)

(72) Inventors: Craig Robinson, Mountain View, CA (US); Alec Berg, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 303 days.

(21) Appl. No.: 18/601,646

(22) Filed: Mar. 11, 2024

(65) Prior Publication Data

US 2024/0219211 A1 Jul. 4, 2024

Related U.S. Application Data

(63) Continuation of application No. 17/437,131, filed as application No. PCT/US2020/022814 on Mar. 13, 2020, now Pat. No. 11,959,776.

(Continued)

(51) Int. Cl.
*G01D 18/00* (2006.01)
*G01B 7/16* (2006.01)
(Continued)

(52) U.S. Cl.
CPC ............. *G01D 18/001* (2021.05); *G01B 7/22* (2013.01); *G01C 19/00* (2013.01); *G01D 5/145* (2013.01); *G01S 13/931* (2013.01); *G01S 17/931* (2020.01)

(58) Field of Classification Search
CPC ...... G01D 18/001; G01D 5/145; G01D 18/00; G01B 7/22; G01C 19/00; G01C 25/005; G01S 13/931; G01S 17/931
(Continued)

(56) References Cited

U.S. PATENT DOCUMENTS

| | | | |
|---|---|---|---|
| 3,998,088 A | 12/1976 | Kazangey | |
| 5,341,702 A * | 8/1994 | Chaney | G01D 18/00 |
| | | | 74/821 |

(Continued)

FOREIGN PATENT DOCUMENTS

| | | |
|---|---|---|
| CN | 105526954 A | 4/2016 |
| EP | 0487681 | 1/1994 |

(Continued)

OTHER PUBLICATIONS

1 The International Search Report (ISR) with Written Opinion for PCT/US2020/022814 dated Jul. 2, 2020, pp. 1-10.

*Primary Examiner* — Arleen M Vazquez
*Assistant Examiner* — Robert P Alejnikov, Jr.
(74) *Attorney, Agent, or Firm* — McDonnell Boehnen Hulbert & Berghoff LLP

(57) ABSTRACT

One example method involves generating a calibration control signal that causes an actuator to rotate a first platform at least one complete rotation about an axis. The method also involves receiving encoder output signals. The encoder output signals are indicative of angular positions of the first platform about the axis. The method also involves receiving sensor output signals from an orientation sensor mounted on the first platform. The sensor output signals are indicative of a rate of change to an orientation of the orientation sensor. The method also involves determining calibration data based on given sensor output signals received from the orientation sensor during the at least one complete rotation. The calibration data is for mapping the encoder output signals to calibrated measurements of the angular positions of the first platform about the axis.

20 Claims, 15 Drawing Sheets

1100

1102 Generate a calibration control signal for controlling an actuator configured to rotate a first platform about an axis, wherein the calibration control signal causes the actuator to rotate the first platform at least one complete rotation about the axis 1104 Receive, from an encoder, encoder output signals indicative of angular positions of the first platform about the axis;

1106 Receive, from an orientation sensor mounted on the first platform, sensor output signals indicative of a rate of change to an orientation of the orientation sensor 1108 Determine, based on given output signals received from the orientation sensor during the at least one complete rotation, calibration data for mapping the encoder output signals to calibrated measurements of the angular positions of the first platform about the axis

Related U.S. Application Data

(60) Provisional application No. 62/818,738, filed on Mar. 14, 2019.

(51) Int. Cl.
| | |
|---|---|
| *G01C 19/00* | (2013.01) |
| *G01D 5/14* | (2006.01) |
| *G01S 13/931* | (2020.01) |
| *G01S 17/931* | (2020.01) |

(58) Field of Classification Search
USPC ......................................................... 324/202
See application file for complete search history.

(56) References Cited

U.S. PATENT DOCUMENTS

| | | | | |
|---|---|---|---|---|
| 8,567,229 | B2 * | 10/2013 | Netzer ................. | G01D 18/008 73/1.77 |
| 9,869,568 | B2 | 1/2018 | Hainz et al. | |
| 10,277,084 | B1 | 4/2019 | Karplus | |
| 10,291,319 | B1 | 5/2019 | Karplus et al. | |
| 10,502,574 | B2 | 12/2019 | Robinson et al. | |
| 10,530,209 | B2 | 1/2020 | Karplus et al. | |
| 11,959,776 | B2 | 4/2024 | Robinson et al. | |
| 2011/0113853 | A1 | 5/2011 | Netzer | |
| 2012/0130667 | A1 * | 5/2012 | Fukushima ............ | G01C 19/00 73/1.37 |
| 2015/0114082 | A1 | 4/2015 | Blanchard | |
| 2016/0003641 | A1 * | 1/2016 | Kaufner .................. | H02K 1/27 310/68 B |
| 2017/0176586 | A1 | 6/2017 | Johnson et al. | |
| 2017/0356766 | A1 * | 12/2017 | Michelitsch ......... | G01D 5/2448 |
| 2018/0123412 | A1 * | 5/2018 | Karplus ............... | H02K 1/2795 |
| 2018/0302151 | A1 * | 10/2018 | Rosenband .......... | H01Q 1/3275 |

FOREIGN PATENT DOCUMENTS

| | | | |
|---|---|---|---|
| JP | 2011-107128 | A | 6/2011 |
| JP | 2011-247747 | A | 12/2011 |
| JP | 2019-035629 | A | 3/2019 |
| WO | 2008068542 | A1 | 6/2008 |
| WO | 2016008936 | A1 | 1/2016 |
| WO | 2017133806 | A1 | 8/2017 |
| WO | 2018080694 | A1 | 5/2018 |

* cited by examiner

Right Side View

Front View

Back View

Top View

100

300

400

400

600

610

628

606

610a 626 624 622 620

700

710

728

723

726  724

722

720

706

710a

900

| Actuator(s) 902 |
| :---: |
| Encoder(s) 904 |

| Platform 906 |
| :---: |
| Orientation Sensor 908 |

| Temperature Sensor 910 |
| :---: |
| Conditioning Device 912 |
| Controller 914 |

1000

1002   Cause an electrical current to flow through an electrically conductive path included in a stator platform and extending around an axis of rotation of a rotor platform 1004   Modulate the electrical current to adjust an orientation of the rotor platform about the axis of rotation

1100

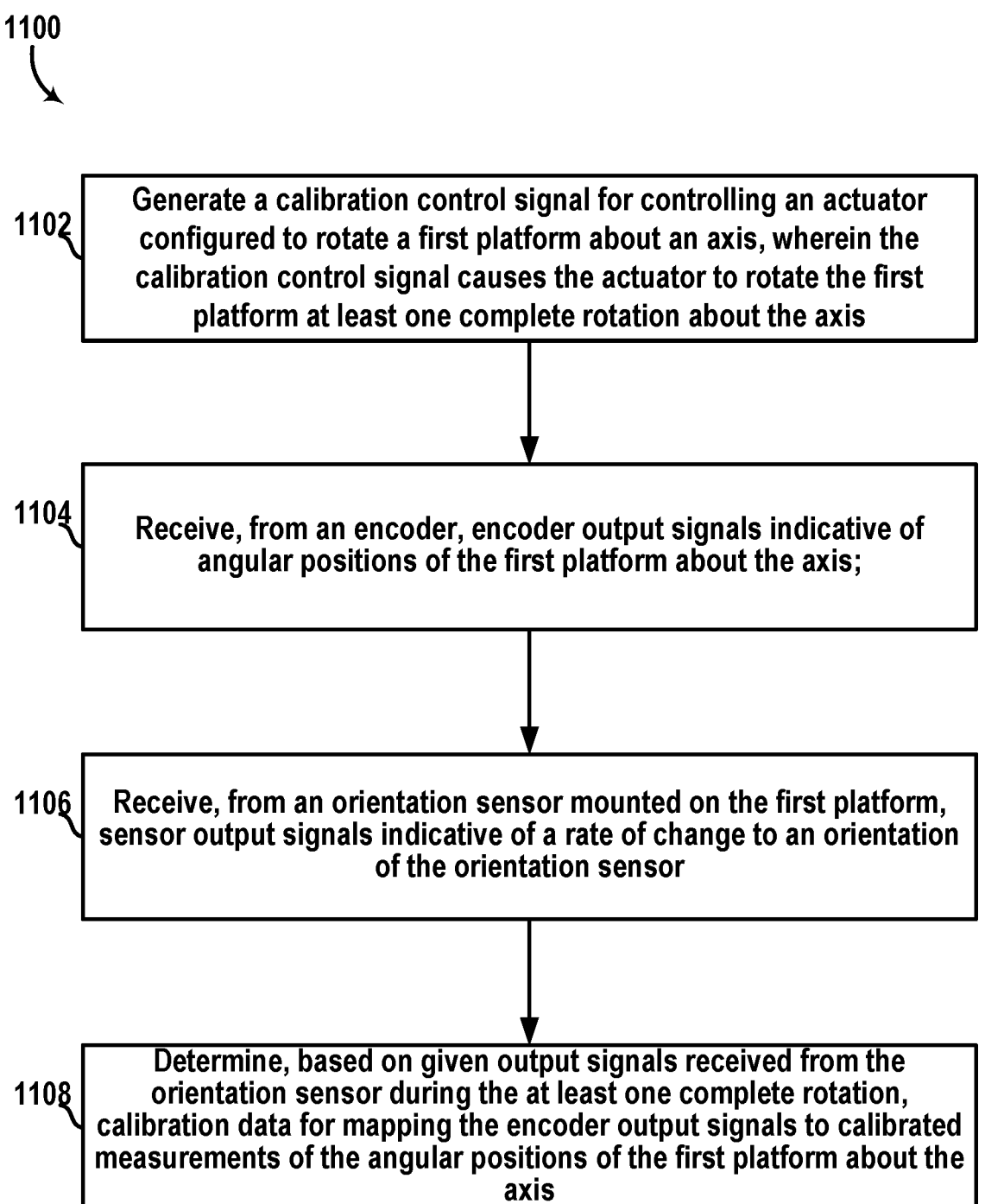

1102 — Generate a calibration control signal for controlling an actuator configured to rotate a first platform about an axis, wherein the calibration control signal causes the actuator to rotate the first platform at least one complete rotation about the axis 1104 — Receive, from an encoder, encoder output signals indicative of angular positions of the first platform about the axis;

1106 — Receive, from an orientation sensor mounted on the first platform, sensor output signals indicative of a rate of change to an orientation of the orientation sensor 1108 — Determine, based on given output signals received from the orientation sensor during the at least one complete rotation, calibration data for mapping the encoder output signals to calibrated measurements of the angular positions of the first platform about the axis

FIG. 11

DEVICES AND METHODS FOR ROTARY ENCODER CALIBRATION

CROSS-REFERENCE TO RELATED APPLICATION

This application is a continuation of U.S. patent application Ser. No. 17/437,131, filed Sep. 8, 2021, which is a U.S. National Phase of International Application No. PCT/US2020/022814, filed Mar. 13, 2020, which claims priority to U.S. Provisional Application No. 62/818,738, filed Mar. 14, 2019. The foregoing applications are incorporated herein by reference in their entirety.

BACKGROUND

Unless otherwise indicated herein, the materials described in this section are not prior art to the claims in this application and are not admitted to be prior art by inclusion in this section.

Rotary joint devices are often used for transmission of power and/or electrical signals between one structure and another structure in an electromechanical system that operates by causing a relative rotation between the two structures (e.g., stator and rotor). Example systems that employ rotary joint devices include remote sensing systems (e.g., RADARs, LIDARs, etc.) and robotic systems (e.g., for directing microphones, speakers, robotic components, etc.), among others.

SUMMARY

In one example, a method is disclosed. The method involves generating a calibration control signal for controlling an actuator. The actuator is configured to rotate a first platform about an axis of rotation. The calibration control signal causes the actuator to rotate the first platform at least one complete rotation about the axis. The method also involves receiving encoder output signals from an encoder. The encoder output signals are indicative of angular positions of the first platform about the axis. The method also involves receiving sensor output signals from an orientation sensor mounted on the first platform. The sensor output signals are indicative of a rate of change to an orientation of the orientation sensor. The method also involves determining calibration data based on given sensor output signals received from the orientation sensor during the at least one complete rotation. The calibration data is for mapping the encoder output signals to calibrated measurements of the angular positions of the first platform about the axis.

In another example, a system is disclosed. The system comprises a first platform and an actuator configured to rotate the first platform about an axis. The system also comprises an encoder configured to provide encoder output signals indicative of angular positions of the first platform about the axis. The system also comprises an orientation sensor mounted on the first platform and configured to provide sensor output signals indicative of a rate of change to an orientation of the orientation sensor. The system also comprises a controller configured to cause the system to perform operations. The operations include generating a calibration control signal for controlling the actuator. The calibration control signal causes the actuator to rotate the first platform at least one complete rotation about the axis. The operations also include determining calibration data based on given sensor output signals received from the orientation sensor during the at least one complete rotation.

The calibration data is for mapping the encoder output signals to calibrated measurements of the angular positions of the first platform about the axis.

In yet another example, a non-transitory computer readable medium is disclosed. The non-transitory computer readable medium stores instructions that, when executed by one or more processors of a computing system, cause the computing system to perform operations. The operations comprise generating a calibration control signal for controlling an actuator configured to rotate a platform about an axis. The calibration control signal causes the actuator to rotate the platform at least one complete rotation about the axis. The operations also comprise receiving encoder output signals from an encoder. The encoder output signals are indicative of angular positions of the platform about the axis. The operations also comprise receiving sensor output signals from an orientation sensor mounted on the platform. The sensor output signals are indicative of a rate of change to an orientation of the orientation sensor. The operations also comprise determining calibration data based on given sensor output signals provided by the orientation sensor during the at least one complete rotation. The calibration data is for mapping the encoder output signals to calibrated measurements of the angular positions of the platform about the axis.

In still another example, a system is disclosed. The system comprises means for generating a calibration control signal for controlling an actuator. The actuator is configured to rotate a first platform about an axis of rotation. The calibration control signal causes the actuator to rotate the first platform at least one complete rotation about the axis. The system also comprises means for receiving encoder output signals from an encoder. The encoder output signals are indicative of angular positions of the first platform about the axis. The system also comprises means for receiving sensor output signals from an orientation sensor mounted on the first platform. The sensor output signals are indicative of a rate of change to an orientation of the orientation sensor. The system also comprises means for determining calibration data based on given sensor output signals received from the orientation sensor during the at least one complete rotation. The calibration data is for mapping the encoder output signals to calibrated measurements of the angular positions of the first platform about the axis.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 11 is a flowchart of another method, according to an example embodiment.

DETAILED DESCRIPTION

Figure 1A:
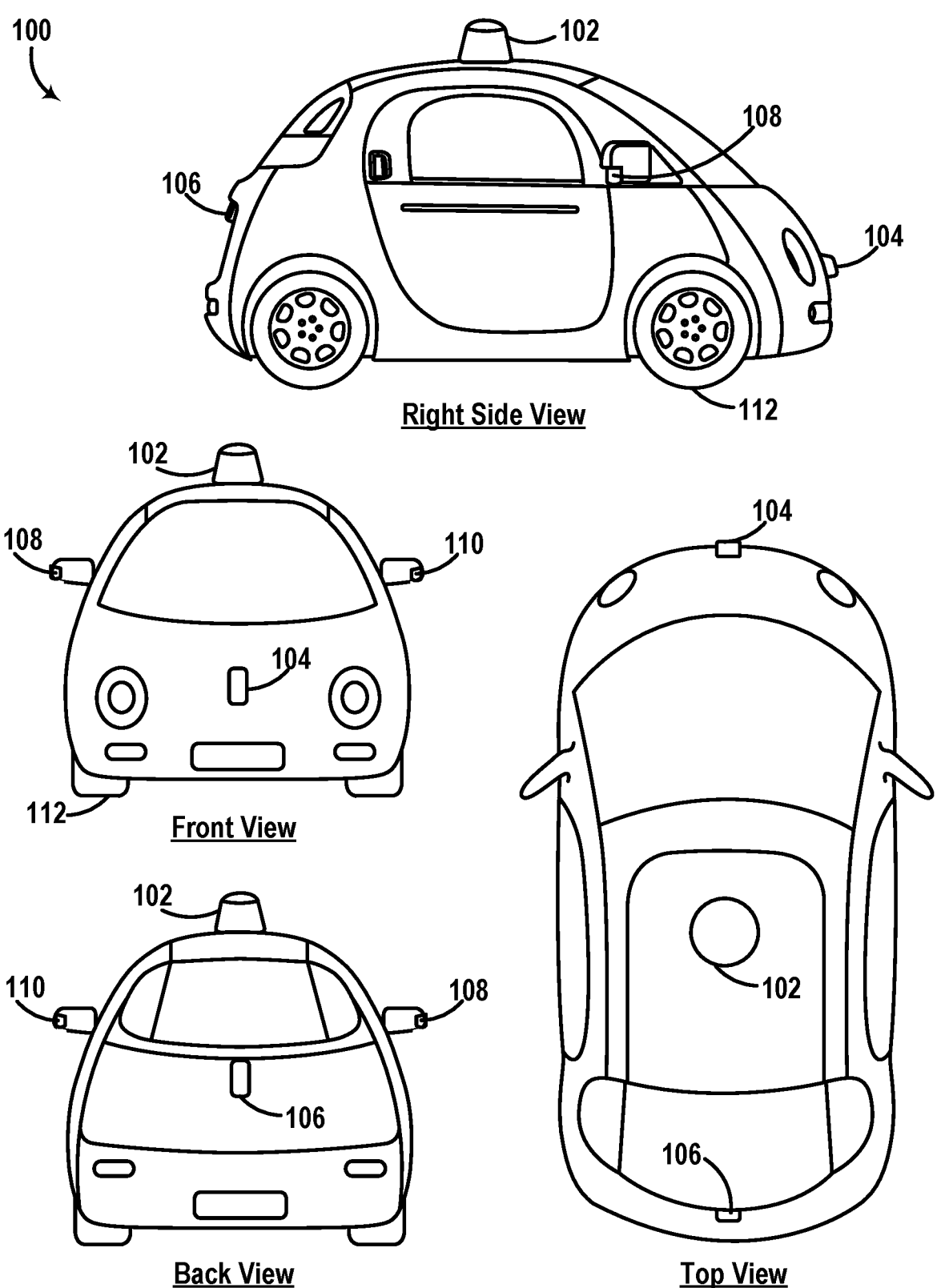
FIG. 1A illustrates a vehicle, according to an example embodiment.

The following detailed description describes various features and functions of the disclosed implementations with reference to the accompanying figures. In the figures, similar symbols identify similar components, unless context dictates otherwise. The illustrative implementations described herein are not meant to be limiting. It may be readily understood by those skilled in the art that certain aspects of the disclosed implementations can be arranged and combined in a wide variety of different configurations.

I. Overview

In some scenarios, measurements indicated by an orientation sensor, such as a gyroscope for instance, can be prone to errors. Example measurement errors or offsets for a gyroscope may include scale factor errors and/or bias errors, among others. A bias error may include an error or offset that is independent from the value of the measurement indicated by the gyroscope. A scale factor error may include an error or offset that increases (linearly or non-linearly) as the value of the measurement indicated by the gyroscope increases. Sensor measurement errors may be due to physical properties of the sensor (e.g., semiconductor properties, mechanical properties, etc.), manufacturing variability between individual sensors, and/or environmental factors (e.g., temperature, humidity, etc.) that affect operation of the sensor, among other factors.

In some implementations, a sensor can be calibrated to measure or otherwise model such errors or offsets. The resulting calibration data can then be used to modify future outputs from the sensor to mitigate the effect of these errors. However, in some examples, the extent, magnitude, and/or other characteristics of these errors may change over time (e.g., drift). As a result, for instance, calibrated sensor measurements may potentially become prone to errors after passage of a certain amount of time from a time when the calibration process is performed.

Additionally, in some scenarios, the sensor calibration process can be time-consuming and/or associated with high calibration (e.g., maintenance) costs. By way of example, consider a scenario where the sensor is mounted to a vehicle, such as a car, truck, boat, or any other vehicle. Calibrating the sensor in this scenario may involve, for instance, driving or otherwise transporting the vehicle to a maintenance location, unmounting the sensor from the vehicle, mounting the sensor to a calibration or test platform, applying a series of sensor inputs to the sensor (e.g., rotating an orientation sensor according to a sequence of predetermined rates of rotation, etc.) to generate the calibration data, unmounting the sensor from the test platform, re-mounting the sensor to the vehicle, and removing or otherwise transporting the vehicle from the maintenance location.

Accordingly, the present disclosure may include additional and/or alternative implementations for calibration and/or mitigation of sensor measurement errors.

In one implementation, a rotary joint device includes two platforms arranged such that a first side of a first platform (e.g., rotor platform) remains within a given distance to a second side of a second platform (e.g., stator platform) in response to a rotation of the first platform. In one example, the two platforms may include circularly shaped disks arranged coaxially about a common axis to maintain an overlap between the two respective sides (separated by the given distance) in response to the rotation of the first platform about the common axis of the two platforms.

In some examples, the device also includes an actuator that rotates the first platform about a platform axis, an encoder that measures angular positions of the first platform about the platform axis, and an orientation sensor mounted on the first platform. The orientation sensor is configured to provide an indication of a rate of change to an orientation of the orientation sensor. For example, the orientation sensor may comprise a gyroscope that has a reference axis that is aligned with and/or substantially parallel to the axis of rotation of the first platform. Thus, in this example, the output of the gyroscope may also indicate a change in the angular position of the first platform about the platform axis.

In some examples, the device also includes a controller (e.g., computing device, logical circuitry, control system, etc.) configured to operate the device in a sensing mode or in a calibration mode.

In a first example, while in the sensing mode, the controller may generate a sensor-mode control signal for controlling the actuator. The sensing-mode control signal may cause the actuator to rotate the first platform (i) along a direction of rotation opposite to a direction of the rate of change to the orientation of the orientation sensor indicated by the sensor output signals and (ii) at a rate of rotation that is based on the rate of change to the orientation of the orientation sensor. For example, the controller can modulate the sensing-mode control signal to cause the actuator to rotate the platform against the rotation of the orientation sensor about its reference axis indicated by the sensor output signals, thereby driving the magnitude of the measurements by the orientation sensor toward a value of zero (or other target value). For instance, the controller may include a proportional-integral (PI) controller or other control loop feedback mechanism for driving the measurements from the orientation sensor toward a target value. With this arrangement, magnitudes of the measurements by the orientation sensor may remain relatively low (e.g., close to a value of zero). As a result, for instance, scale factor errors dependent on the magnitudes of these measurements can be reduced. Additionally, in this example, the controller can estimate the direction or orientation of the device based on the measurements of the angular positions of the first platform about the platform axis (collected by the encoder during the rotation caused by the actuator), which are indicated by the encoder output signals.

However, in some scenarios, the measurements of the angular positions of the first platform about the platform axis indicated by the encoder output signals may also be prone to encoder measurement errors. For instance, in one example implementation of the encoder disclosed herein, the encoder includes a plurality of magnets disposed on the first platform and arranged around the platform axis in a substantially circular arrangement. The encoder also includes a magnetic field sensor (e.g., Hall effect sensor, etc.) disposed on the second platform opposite to the plurality of magnets. In this implementation, the encoder output signals may be based on measurements of a first magnetic field generated by the plurality of magnets and measured by the magnetic field sensor. Thus, the encoder measurement errors may include errors caused by an encoder defect related to a circularity of the arrangement of the plurality of magnets, an encoder defect related to a concentricity of the first magnetic field relative to the platform axis of rotation (e.g., at a surface of the second platform where the magnetic field sensor is mounted), among other possible physical defects in the encoder. Thus, some implementations herein may involve calibrating the encoder output signals as well.

For instance, in a second example where the controller is operating the device in the calibration mode, the controller may be configured to generate a calibration control signal for controlling the actuator. The calibration control signal may cause the actuator to rotate the first platform about the platform axis in a predetermined manner (e.g., predetermined rates and/or directions of rotation, etc.). While the first platform is rotating in the calibration mode, the controller may receive given sensor output signals from the orientation sensor. Based on the given sensor output signals, the controller may then determine calibration data for mapping the angular positions of the first platform about the platform axis indicated by the encoder output signals to calibrated measurements of the angular positions of the first platform about the platform axis.

Other example arrangements, configurations, functionalities, and operations are possible as well and are described in greater detail within exemplary implementations herein.

II. Example Electromechanical Systems and Devices

Systems and devices in which example embodiments may be implemented will now be described in greater detail. In general, the embodiments disclosed herein can be used with any electromechanical system that includes a moveable component. An example system can provide for transmission of power and/or signals between the moveable component and other parts of the system. Illustrative embodiments described herein include vehicles that have moveable components such as sensors and wheels that communicate with other components of the vehicle and/or with one another. However, an example electromechanical system may also be implemented in or take the form of other devices, such as sensor platforms (e.g., RADAR platforms, LIDAR platforms, direction sensing platforms, etc.), robotic devices, industrial systems (e.g., assembly lines, etc.), medical devices (e.g., medical imaging devices, etc.), or mobile communication systems, among others.

Further, it is noted that the term "vehicle" is broadly construed herein to cover any moving object including, for instance, an aerial vehicle, watercraft, spacecraft, a car, a truck, a van, a semi-trailer truck, a motorcycle, a golf cart, an off-road vehicle, a warehouse transport vehicle, a farm vehicle, or a carrier that rides on a track (e.g., roller coaster, trolley, tram, train car, etc.), among others.

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously or that are configured to operate semi-autonomously. Thus, the example vehicle 100 is not meant to be limiting. As shown, the vehicle 100 includes five sensor units 102, 104, 106, 108, and 110, and four wheels, exemplified by wheel 112.

In some embodiments, sensor units 102-110 may include any combination of sensors, such as global positioning system sensors, inertial measurement units, radio detection and ranging (RADAR) units, cameras, laser rangefinders, LIDARs, and/or acoustic sensors among other possibilities.

As shown, sensor unit 102 is mounted to a top side of the vehicle 100 opposite to a bottom side of the vehicle 100 where the wheel 112 is mounted. Further, sensor units 104-110 are respectively mounted to respective sides of vehicle 100 other than the top side. As shown, sensor unit 104 is positioned at a front side of vehicle 100, sensor 106 is positioned at a back side of vehicle 100, the sensor unit 108 is positioned at a right side of vehicle 100, and sensor unit 110 is positioned at a left side of vehicle 100.

Although sensor units 102-110 are shown to be mounted in particular locations on vehicle 100, in some embodiments, sensor units 102-110 can be alternatively mounted in different locations, either inside or outside vehicle 100. For example, although FIG. 1A shows sensor unit 108 mounted to a rear-view mirror of vehicle 100, the sensor unit 108 may alternatively be positioned in another location along the right side of vehicle 100. As another example, vehicle 100 can be implemented to include more sensor units mounted along a roof (e.g., top side) of vehicle 100, and fewer or no sensors mounted along other sides (e.g., right side, left side, etc.) of vehicle 100. Other arrangements and configurations of sensor units 102-110 are possible as well. Thus, while five sensor units are shown, in some embodiments, more or fewer sensor units may be included in vehicle 100. However, for the sake of example, sensor units 102-110 are positioned as shown in FIG. 1A.

In some embodiments, one or more of sensor units 102-110 may include one or more movable mounts on which the sensors may be movably mounted. The movable mount may include, for example, a rotating platform. Alternatively or additionally, the movable mount may include a tilting platform. Sensors mounted on the tilting platform could be tilted within a given range of angles and/or azimuths. The movable mount may take other forms as well.

Further, in some embodiments, one or more of sensor units 102-110 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, vehicle 100 includes one or more wheels such as wheel 112 that are configured to rotate to cause the vehicle to travel along a driving surface. In some embodiments, wheel 112 may include at least one tire coupled to a rim of wheel 112. To this end, wheel 112 may include any combination of metal and rubber, or a combination of other materials. Vehicle 100 may include one or more other components in addition to or instead of those shown.

Figure 1B:
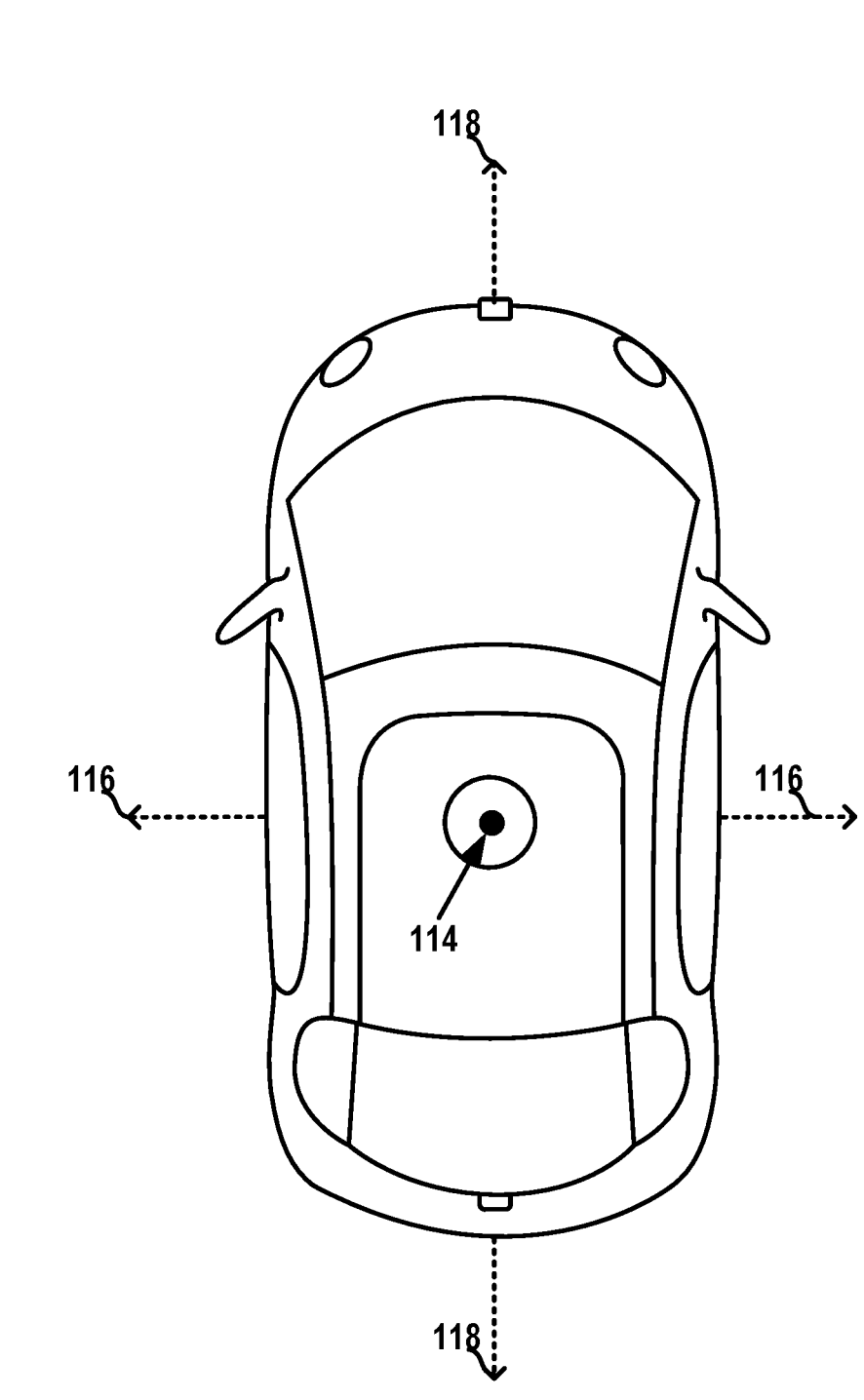
FIG. 1B is another illustration of the vehicle of FIG. 1A.

FIG. 1B illustrates another top view of vehicle 100. In some scenarios, vehicle 100 may rotate about one or more axes of rotation of vehicle 100, which are shown as yaw axis 114, pitch axis 116, and roll axis 118. Yaw axis 114 may correspond to a height-wise axis extending through the top of the vehicle (and out of the page). In an example scenario, a yaw rotation of vehicle 100 about yaw axis 114 may correspond to adjusting a pointing or heading direction of vehicle 100 (e.g., direction of motion or travel along a driving surface, etc.).

Pitch axis 116 may correspond to a rotational axis that extends widthwise through the right side and left side of vehicle 100. In an example scenario, a pitch rotation of vehicle 100 about pitch axis 116 may result from an acceleration or deceleration (e.g., application of brakes, etc.) of vehicle 100. For instance, a deceleration of the vehicle may cause the vehicle to tilt toward the front side of the vehicle (i.e., pitch rotation about pitch axis 116). In this scenario, front wheel shocks (not shown) of vehicle 100 may compress to absorb the force due to the change of momentum of the vehicle, and back wheel shocks (not shown) may expand to allow the vehicle to tilt toward the front side. In another example scenario, a pitch rotation of vehicle 100 about pitch axis 116 may result from vehicle 100 traveling along a sloped driving surface (e.g., hill, etc.), thereby causing vehicle 100 to tilt upwards or downwards (i.e., pitch-wise) depending on the slope of the driving surface. Other scenarios are possible as well.

Roll axis 118 may correspond to a rotational axis that extends lengthwise through the front side and the back side of vehicle 100. In an example scenario, a roll rotation of vehicle 100 about roll axis 118 may occur in response to the vehicle performing a turning maneuver. For instance, if the vehicle performs a sudden right turn maneuver, the vehicle may bank toward the left side (i.e., roll rotation about roll axis 118) in response to a force caused by the changing momentum of the vehicle or a centripetal force acting on the vehicle due to the right turn maneuver, etc. In another example scenario, a roll rotation of vehicle 100 about roll axis 118 may occur as a result of vehicle 100 traveling along a curved driving surface (e.g., road camber, etc.), which may cause vehicle 100 to tilt sideways (i.e., roll-wise) depending on the curvature of the driving surface. Other scenarios are possible as well.

It is noted that the positions of the various rotational axes 114, 116, 118 may vary depending on various physical characteristics of vehicle 100, such as the location of a center of gravity of the vehicle, locations and/or mounting positions of wheels of the vehicle, etc. Thus, the various axes 114, 116, 118 are illustrated as shown only for the sake of example. For instance, roll axis 118 can be alternatively positioned to have a different path through the front side and back side of vehicle 118, and yaw axis 114 may extend through a different region of the top side of vehicle 100 than shown, etc.

Figure 2:
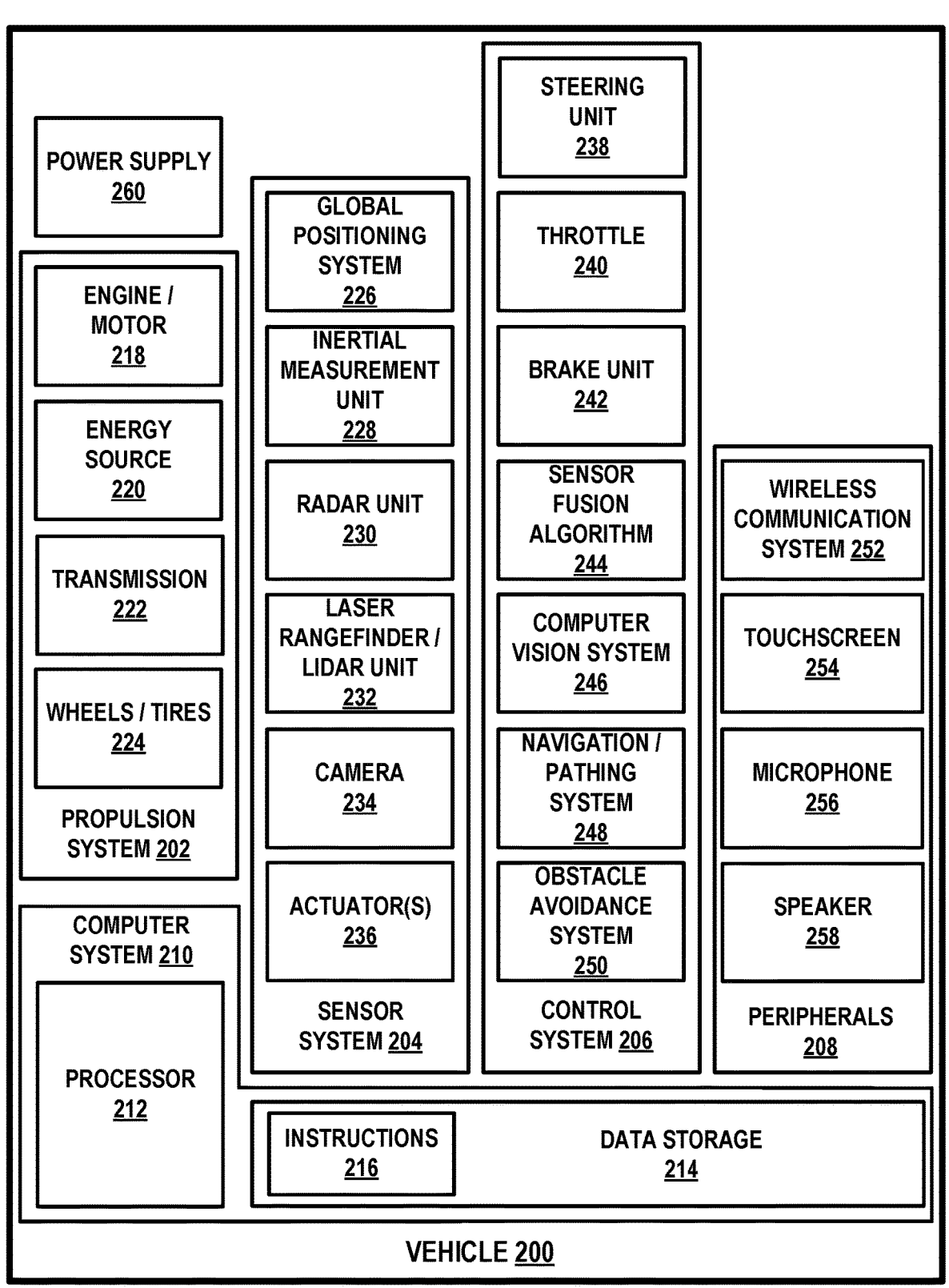
FIG. 2 is a simplified block diagram of a vehicle, according to an example embodiment.

FIG. 2 is a simplified block diagram of a vehicle 200, according to an example embodiment. Vehicle 200 may be similar to vehicle 100, for example. As shown, vehicle 200 includes a propulsion system 202, a sensor system 204, a control system 206, peripherals 208, and a computer system 210. In other embodiments, vehicle 200 may include more, fewer, or different systems, and each system may include more, fewer, or different components. Further, the systems and components shown may be combined or divided in any number of ways.

Propulsion system 202 may be configured to provide powered motion for the vehicle 200. As shown, propulsion system 202 includes an engine/motor 218, an energy source 220, a transmission 222, and wheels/tires 224.

Engine/motor 218 may be or include any combination of an internal combustion engine, an electric motor, a steam engine, and a Stirling engine. Other motors and engines are possible as well. In some embodiments, propulsion system 202 may include multiple types of engines and/or motors. For instance, a gas-electric hybrid car may include a gasoline engine and an electric motor. Other examples are possible.

Energy source 220 may be a source of energy that powers the engine/motor 218 in full or in part. That is, engine/motor 218 may be configured to convert energy source 220 into mechanical energy. Examples of energy sources 220 include gasoline, diesel, propane, other compressed gas-based fuels, ethanol, solar panels, batteries, and other sources of electrical power. Energy source(s) 220 may additionally or alternatively include any combination of fuel tanks, batteries, capacitors, and/or flywheels. In some embodiments, energy source 220 may provide energy for other systems of vehicle 200 as well.

Transmission 222 may be configured to transmit mechanical power from engine/motor 218 to wheels/tires 224. To this end, transmission 222 may include a gearbox, clutch, differential, drive shafts, and/or other elements. In embodiments where transmission 222 includes drive shafts, the drive shafts may include one or more axles that are configured to be coupled to wheels/tires 224.

Wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, wheels/tires 224 may be configured to rotate differentially with respect to other wheels/tires 224. In some embodiments, wheels/tires 224 may include at least one wheel that is fixedly attached to transmission 222 and at least one tire coupled to a rim of the wheel that could make contact with a driving surface. Wheels/tires 224 may include any combination of metal and rubber, or combination of other materials. Propulsion system 202 may additionally or alternatively include components other than those shown.

Sensor system 204 may include any number of sensors configured to sense information about vehicle 200 and/or an environment in which vehicle 200 is located, as well as one or more actuators 236 configured to modify a position and/or orientation of the sensors. As shown, sensor system 204 includes a Global Positioning System (GPS) 226, an inertial measurement unit (IMU) 228, a RADAR unit 230, a laser rangefinder and/or LIDAR unit 232, and a camera 234. Sensor system 204 may include additional sensors as well, including, for example, sensors that monitor internal systems of vehicle 200 (e.g., an $O_2$ monitor, a fuel gauge, an engine oil temperature, etc.). Other sensors are possible as well. In some examples, sensor system 204 may be implemented as multiple sensor units each mounted to the vehicle in a respective position (e.g., top side, bottom side, front side, back side, right side, left side, etc.).

GPS 226 may include any sensor (e.g., location sensor) configured to estimate a geographic location of vehicle 200. To this end, for example, GPS 226 may include a transceiver configured to estimate a position of vehicle 200 with respect to the Earth. IMU 228 may include any combination of direction sensors configured to sense position and orientation changes of the vehicle 200 based on inertial acceleration. Example IMU sensors include accelerometers, gyroscopes, other direction sensors, etc.. RADAR unit 230 may include any sensor configured to sense objects in an environment in which vehicle 200 is located using radio signals. In some embodiments, in addition to sensing the objects, RADAR unit 230 may be configured to sense the speed and/or heading of the objects.

Laser rangefinder or LIDAR unit 232 may include any sensor configured to sense objects in the environment in which vehicle 200 is located using light. In particular, laser rangefinder or LIDAR unit 232 may include one or more light sources configured to emit one or more beams of light and a detector configured to detect reflections of the one or more beams of light. Laser rangefinder or LIDAR 232 may be configured to operate in a coherent (e.g., using heterodyne detection) or an incoherent detection mode. In some examples, LIDAR unit 232 may include multiple LIDARs, with each LIDAR having a particular position and/or configuration suitable for scanning a particular region of an environment around vehicle 200.

Camera 234 may include any camera (e.g., still camera, video camera, etc.) that can capture images of an environment of vehicle 200. Actuator(s) 236 may include any type of actuator configured to adjust a position, orientation, and/or pointing direction of one or more of the sensors of system 204. Example actuators include motors, pneumatic actuators, hydraulic pistons, relays, solenoids, and piezoelectric actuators, among other examples. Sensor system 204 may additionally or alternatively include components other than those shown.

Control system 206 may be configured to control operation of vehicle 200 and/or components thereof. To this end, control system 206 may include a steering unit 238, a throttle 240, a brake unit 242, a sensor fusion algorithm 244, a computer vision system 246, a navigation or pathing system 248, and an obstacle avoidance system 250.

Steering unit 238 may be any combination of mechanisms configured to adjust the heading of vehicle 200. Throttle 240 may be any combination of mechanisms configured to control the operating speed of engine/motor 218 and, in turn, the speed of vehicle 200. Brake unit 242 may be any combination of mechanisms configured to decelerate vehicle 200. For example, brake unit 242 may use friction to slow wheels/tires 224. In some examples, brake unit 242 may also convert kinetic energy of wheels/tires 224 to an electric current.

Sensor fusion algorithm 244 may be an algorithm (or a computer program product storing an algorithm) configured to accept data from sensor system 204 as an input. The data may include, for example, data representing information sensed at the sensors of sensor system 204. Sensor fusion algorithm 244 may include, for example, a Kalman filter, a Bayesian network, an algorithm for some of the functions of the methods herein, or any other algorithm. Sensor fusion algorithm 244 may further be configured to provide various assessments based on the data from sensor system 204, including, for example, evaluations of individual objects and/or features in the environment in which vehicle 100 is located, evaluations of particular situations, and/or evaluations of possible impacts based on particular situations.

Computer vision system 246 may be any system configured to process and analyze images captured by camera 234 in order to identify objects and/or features in the environment in which vehicle 200 is located, including, for example, traffic signals and obstacles. To this end, computer vision system 246 may use an object recognition algorithm, a Structure from Motion (SFM) algorithm, video tracking, or other computer vision techniques. In some embodiments, computer vision system 246 may additionally be configured to map the environment, track objects, estimate the speed of objects, etc.

Navigation and pathing system 248 may be any system configured to determine a driving path for vehicle 200. Navigation and pathing system 248 may additionally be configured to update the driving path dynamically while vehicle 200 is in operation. In some embodiments, navigation and pathing system 248 may be configured to incorporate data from sensor fusion algorithm 244, GPS 226, LIDAR unit 232, and/or one or more predetermined maps of the environment of vehicle 200, so as to determine a driving path for vehicle 200. Obstacle avoidance system 250 may be any system configured to identify, evaluate, and avoid or otherwise negotiate obstacles in the environment in which vehicle 200 is located. Control system 206 may additionally or alternatively include components other than those shown.

Peripherals 208 (e.g., input interface, output interface, etc.) may be configured to allow vehicle 200 to interact with external sensors, other vehicles, external computing devices, and/or a user. To this end, peripherals 208 may include, for example, a wireless communication system 252, a touchscreen 254, a microphone 256, and/or a speaker 258.

Wireless communication system 252 may be any system configured to wirelessly couple to one or more other vehicles, sensors, or other entities, either directly or via a communication network. To this end, wireless communication system 252 may include an antenna and a chipset for communicating with the other vehicles, sensors, servers, or other entities either directly or via a communication network. Chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. Wireless communication system 252 may take other forms as well.

Touchscreen 254 may be used by a user as an input interface to input commands to vehicle 200. To this end, touchscreen 254 may be configured to sense at least one of a position and a movement of a user's finger via capacitive sensing, resistance sensing, or a surface acoustic wave process, among other possibilities. Touchscreen 254 may be capable of sensing finger movement in a direction parallel or planar to the touchscreen surface, in a direction normal to the touchscreen surface, or both, and may also be capable of sensing a level of pressure applied to the touchscreen surface. Touchscreen 254 may be formed of one or more translucent or transparent insulating layers and one or more translucent or transparent conducting layers. Touchscreen 254 may take other forms as well.

Microphone 256 may be configured to receive audio (e.g., a voice command or other audio input) from a user of vehicle 200. Similarly, speakers 258 may be configured to output audio to the user of vehicle 200. Peripherals 208 may additionally or alternatively include components other than those shown.

Computer system 210 may be configured to transmit data to, receive data from, interact with, and/or control one or more of propulsion system 202, sensor system 204, control system 206, and peripherals 208. To this end, computer system 210 may be communicatively linked to one or more of propulsion system 202, sensor system 204, control system 206, and peripherals 208 by a system bus, network, and/or other connection mechanism (not shown).

In one example, computer system 210 may be configured to control operation of transmission 222 to improve fuel efficiency. As another example, computer system 210 may be configured to cause camera 234 to capture images of the environment. As yet another example, computer system 210 may be configured to store and execute instructions corresponding to sensor fusion algorithm 244. Other examples are possible as well.

As shown, computer system 210 includes processor 212 and data storage 214. Processor 212 may comprise one or more general-purpose processors and/or one or more special-purpose processors. To the extent processor 212 includes more than one processor, such processors could work separately or in combination. Data storage 214, in turn, may comprise one or more volatile and/or one or more non-volatile storage components, such as optical, magnetic, and/or organic storage among other possibilities, and data storage 214 may be integrated in whole or in part with processor 212.

In some embodiments, data storage 214 contains instructions 216 (e.g., program logic) executable by processor 212 to execute various vehicle functions. Data storage 214 may contain additional instructions as well, including instructions to transmit data to, receive data from, interact with, and/or control one or more of propulsion system 202, sensor system 204, control system 206, and/or peripherals 208. In some embodiments, data storage 214 also contains calibration data for one or more of the sensors in sensor system 204. For example, the calibration data may include a mapping between previously obtained sensor measurements and one or more predetermined inputs to the sensors. Computer system 210 may additionally or alternatively include components other than those shown.

Power supply 260 may be configured to provide power to some or all of the components of vehicle 200. To this end, power supply 260 may include, for example, a rechargeable lithium-ion or lead-acid battery. In some embodiments, one or more banks of batteries could be configured to provide electrical power. Other power supply materials and configurations are possible as well. In some embodiments, power supply 260 and energy source 220 may be implemented together as one component, as in some all-electric cars for instance.

In some embodiments, vehicle 200 may include one or more elements in addition to or instead of those shown. For example, vehicle 200 may include one or more additional interfaces and/or power supplies. Other additional components are possible as well. In such embodiments, data storage 214 may further include instructions executable by processor 212 to control and/or communicate with the additional components. Still further, while each of the components and systems are shown to be integrated in vehicle 200, in some embodiments, one or more components or systems can be removably mounted on or otherwise connected (mechanically or electrically) to vehicle 200 using wired or wireless connections.

III. Example Rotary Joint Configurations

Within examples, a rotary joint may be configured as an interface between two structures of an electromechanical system, in which one or both of the two structures is configured to rotate or otherwise move relative to the other structure. To that end, in some implementations, a portion of the rotary joint (e.g., rotor) may be coupled to one structure of the example system and another portion (e.g., stator) may be coupled to the other structure of the example system. Additionally or alternatively, in some implementations, the rotary joint may be included within a structure arranged between two structures that rotate (or move) with respect to one another. For instance, an example rotary joint could be disposed in a robotic joint that couples two robotic links. Other implementations are possible as well.

Figure 3:
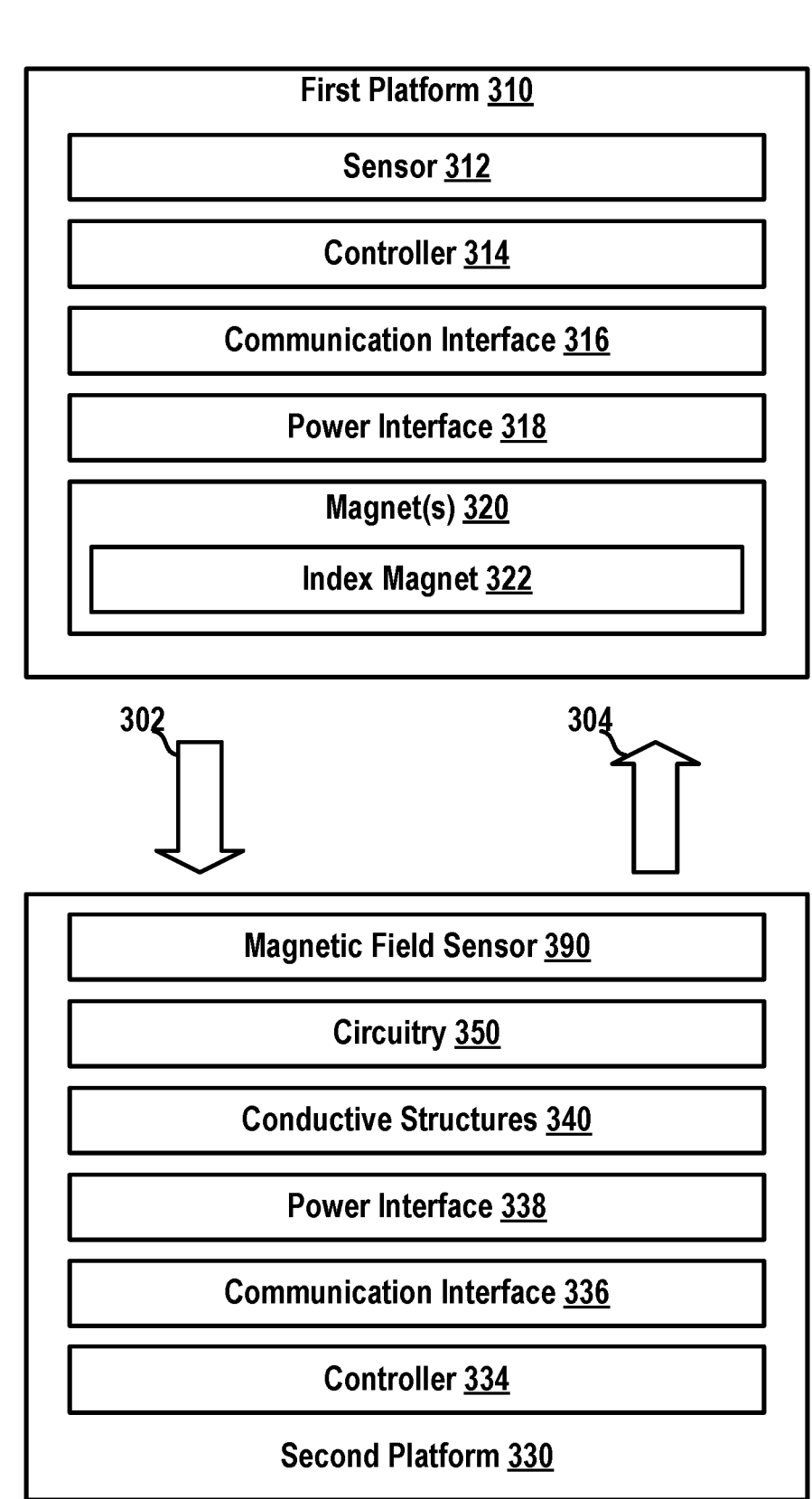
FIG. 3 is a simplified block diagram of a device that includes a rotary joint, according to an example embodiment.

FIG. 3 is a simplified block diagram of a device 300 that includes a rotary joint, according to an example embodiment. For example, device 300 can be used as an interface between moveable components of an electromechanical system, such as any of vehicles 100, 200, and/or any other electromechanical system. Thus, for instance, device 300 can be physically implemented as a rotary joint that facilitates power transmission between two moveable components of the system (or subsystem), such as a rotating platform that mounts sensors included in sensor units 102, 104, 106, 108, 110, sensor system 204, among other examples. As shown, device 300 includes a first platform 310 and a second platform 330.

First platform 310 may comprise or may be coupled to a rotor or other moveable component. For example, platform 310 can be configured to rotate relative to platform 330 and about an axis of rotation of platform 310 (e.g., rotor axis). Thus, within examples, platform 310 can be configured as a rotating platform in a rotary joint configuration. As shown, platform 310 includes a sensor 312, a controller 314, a communication interface 316, a power interface 318, and one or more magnets 320.

In some examples, platform 310 may comprise any solid material suitable for supporting and/or mounting various components of platform 310. For instance, platform 310 may include a printed circuit board (PCB) that mounts communication interface 316 and/or other components of platform 310. The PCB in this instance can also include circuitry (not shown) to electrically couple one or more of the components of platform 310 (e.g., sensor 312, controller 314, communication interface 316, power interface 318, etc.) to one another. The PCB in this instance can be positioned such that the mounted components are along a side of platform 310 facing or opposite to a corresponding side of platform 330. With this arrangement, for instance, platforms 310 and 330 may remain within a predetermined distance to one another in response to a rotation of platform 310 relative to platform 330.

Sensor 312 may include any combination of sensors mounted to platform 310, such as one or more sensors of sensor system 204, one or more of the sensors included in vehicle 100, and/or any other sensor that can be mounted on platform 310. A non-exhaustive list of example sensors may include direction sensors (e.g., gyroscopes), remote sensing devices (e.g., RADARs, LIDARs, etc.), sound sensors (e.g., microphones), among other examples.

Controller 314 may be configured to operate one or more of the components of first platform 310. To that end, controller 314 may include any combination of general-purpose processors, special-purpose-processors, data storage, logic circuitry, and/or any other circuitry configured to operate one or more components of device 300. In one implementation, similarly to computing system 210, controller 314 includes one or more processors (e.g., processor 212) that execute instructions (e.g., instructions 216) stored in data storage (e.g., data storage 214) to operate sensor 312, interface 316, etc. In another implementation, controller 314 alternatively or additionally includes circuitry wired to perform one or more of the functions and processes described herein for operating one or more components of device 300. In one example, controller 314 can be configured to receive sensor data collected by sensor 312, and to provide a modulated electrical signal indicative of the sensor data to communication interface 316. For instance, the sensor data may indicate a measured orientation of sensor 312, a scan of a surrounding environment, detected sounds, and/or any other sensor output of sensor 312.

Communication interface 316 may include any combination of wireless or wired communication components (e.g., transmitters, receivers, antennas, light sources, light detectors, etc.) configured to transmit (e.g., signal 302) and/or receive (e.g., signal 304) data and/or instructions between platforms 310 and 330. In one example, where communication interface 316 is an optical communication interface, interface 316 may include one or more light sources arranged to emit modulated light signal 302 for receipt by a light detector included in platform 330. For instance, signal 302 may indicate sensor data collected by sensor 312. Further, in this example, interface 316 may include a light detector for receiving modulated light signal 304 emitted from platform 330. For instance, signal 304 may indicate instructions for operating sensor 312 and/or any other component coupled to platform 310. In this instance, controller 314 can operate sensor 312 based on the received instructions detected via interface 316.

Power interface 318 may include one or more components configured for wireless (or wired) transmission of power between platforms 310 and 330. By way of example, interface 318 may include transformer coil(s) (not shown) arranged to receive a magnetic flux extending through the transformer coils to induce an electrical current for powering one or more components (e.g., sensor 312, controller 314, communication interface 316, etc.) of platform 310. For instance, the transformer coils can be arranged around a center region of platform 310 opposite to corresponding transformer coils included in platform 330. Further, for instance, device 300 may also include a magnetic core (not shown) extending through the transformer coils in interface 318 (and/or transformer coils included in platform 330) to guide the magnetic flux through the respective transformer coils thereby improving efficiency of power transmission between the two platforms. Other configurations are possible as well.

Magnet(s) 320 may can be formed from a ferromagnetic material such as iron, ferromagnetic compounds, ferrites, etc., and/or any other material that is magnetized to generate a first-platform magnetic field of platform 310.

In one implementation, magnets 320 can be implemented as a plurality of magnets in a substantially circular arrangement around an axis of rotation of platform 310. For example, magnets 320 can be arranged along a circle that is concentric to the axis of rotation to generate a combined magnetic field extending toward and/or through platform 330. Further, for instance, adjacent magnets of magnets 320 can be magnetized in alternating directions such that a magnetic pole of a given magnet along a surface of the given magnet that is facing platform 330 is opposite to a magnetic pole of an adjacent magnet along a similar surface. With this arrangement for instance, a magnetic field may extend from the surface of the given magnet toward platform 330 and then toward the surface of the adjacent magnet. Further, another magnetic field may extend from a surface of the given magnet toward platform 330 and then toward another adjacent magnet.

In another implementation, magnet 320 can be implemented as a single ring magnet that is concentric to the axis of rotation of the first platform. In this implementation, the ring magnet can be magnetized to have a magnetization pattern similar to that of the plurality of magnets described above. For example, the ring magnet can be implemented as a printed magnet having a plurality of ring sectors (e.g., regions of the ring magnet between respective radial axes thereof). In this example, adjacent ring sectors of the ring magnet can be magnetized in alternating directions to define a plurality of alternating magnetic poles facing platform 330.

As shown, magnet(s) 320 can optionally include an index magnet 322. Index magnet 322 may include a magnet (e.g., ferromagnetic material, etc.) that is configured to have a characteristic that differs from that of the other magnets in magnets 320.

In a first example, where magnets 320 include a plurality of magnets in a circular arrangement, index magnet 322 can be positioned at a first distance to the axis of rotation of platform 310, and the other magnets in magnets 320 can be positioned at a second distance to the axis of rotation that differs from the first distance. Additionally or alternatively, for instance, index magnet 322 can be positioned at an offset distance to the second platform relative to a substantially uniform distance between the other magnets and the second platform. Additionally or alternatively, for instance, index magnet 322 can be positioned at a particular separation distance to one or more adjacent magnets. In this instance, the other magnets can be spaced apart by a substantially uniform separation distance that differs from the particular separation distance.

In a second example, index magnet 322 can have a first size (e.g., width, length, depth, etc.) that differs from a second size of the other magnets in magnets 320.

In a third example, index magnet 322 can be magnetized to have a first magnetization strength (e.g., magnetic flux density, magnetic field strength, etc.) that differs from a second magnetization strength of the other magnets in magnets 320.

In a fourth example, index magnet 322 can be magnetized to have a different magnetization pattern compared to magnetization patterns of the other magnets in magnets 320. For instance, a first portion of index magnet 322 can be magnetized in a first direction (e.g., North Pole pointing toward platform 330) and a second portion of index magnet 322 can be magnetized in a second direction opposite to the first direction (e.g., South Pole pointing toward platform 330), whereas, the other magnets in magnets 320 can be magnetized in a single direction (e.g., only one of North Pole or South Pole pointing toward platform 330).

In a fifth example, where magnet(s) 320 comprise a single ring magnet, index magnet 322 can be implemented as an index ring sector of magnet 320 that includes a first portion magnetized in a first direction, and a second portion magnetized in an opposite direction. Alternatively or additionally, the second portion can be physically implemented as a magnetized region of magnet 320 that surrounds the first portion and connects with two ring sector that are adjacent to the index ring sector.

In a sixth example, where magnet(s) 320 comprise a single ring magnet, the various differentiating characteristics described above for an implementation that comprises a plurality of magnets can be similarly implemented by adjusting the magnetization properties of the ring magnet. In one instance, the index ring sector can have a different size (e.g., angular width, etc.) relative to substantially uniform sizes of other ring sectors. In another instance, the index ring sector can be separated from adjacent ring sectors by a different distance than a corresponding substantially uniform distance between the other ring sectors (e.g., surrounding the index ring sector by demagnetized regions of the ring magnet, etc.).

Second platform 330 can be configured as a stator platform in a rotary joint configuration, in line with the discussion above. For instance, the axis of rotation of platform 310 can extend through platform 330 such that platform 310 rotates relative to platform 330 while remaining within a predetermined distance to platform 330. As shown, platform 330 includes a controller 334, a communication interface 336, a power interface 338, a plurality of conductive structures 340, circuitry 350, and a magnetic field sensor 390. Thus, for example, platform 330 can be formed from any combination of solid materials suitable for supporting the various components mounted or otherwise coupled to platform 330. For instance, platform 330 may comprise a circuit board that mounts one or more components (e.g., interfaces 336, 338, sensor 390, etc.).

Controller 334 can have various physical implementations (e.g., processors, logic circuitry, analog circuitry, data storage, etc.) similarly to controller 314, for example. Further, controller 334 can operate communication interface 336 to transmit signal 304 indicating a transmission of data or instructions similarly to, respectively, controller 314, communication interface 316, and signal 302. For instance, controller 334 can operate interface 336 (e.g., transceiver, antenna, light sources, etc.) to provide a modulated wireless signal indicating instructions for operating sensor 312 and/or any other component of platform 310. Further, for instance, controller 334 can receive a modulated electrical signal from interface 336 indicating modulated signal 302 transmitted from platform 310.

Accordingly, communication interface 336 can be implemented similarly to communication interface 316 to facilitate communication between platforms 310 and 330 via signals 302 and 304.

Power interface 338 can be configured similarly to power interface 318, and may thus be operated in conjunction with power interface 318 to facilitate transmission of power between platforms 310 and 330. By way of example, interface 338 may comprise a transformer coil (not shown), and controller 334 can be configured to cause an electrical current to flow through the transformer coil. The electrical current may then generate a magnetic flux that extends through a corresponding transformer coil (not shown) of power interface 318 to induce an electrical current through the corresponding transformer coil. The induced electrical current could thus provide power for one or more components of platform 310. Further, in some instances, device 300 may also include a magnetic core (not shown) extending along the axis of rotation of platform 310 and through the respective transformer coils (not shown) of power interfaces 318 and 338. The magnetic core, for instance, can guide the magnetic flux generated by a transformer coil of power interface 338 through a transformer coil of power interface 318 to improve efficiency of power transmission between platforms 310 and 330.

Conductive structures 340 may comprise portions of electrically conductive material (e.g., copper, other metal, etc.) that are electrically coupled together to define an electrically conductive path that extends around the axis of rotation of platform 310 to overlap the first-platform magnetic field generated by magnet(s) 320. By way of example, conductive structures 340 may include a first plurality of conductive structures in a first coplanar arrangement along a circle that is concentric to the axis of rotation of platform 310. Further, in this example, conductive structures 340 may also include a second plurality of conductive structures in a second coplanar arrangement to overlap parallel to the first plurality of conductive structures. For instance, in a circuit board implementation, the first plurality of conductive structures can be disposed or patterned along a single layer of the circuit board, and the second plurality of conductive structures can be disposed or patterned along another layer of the circuit board.

Continuing with the example above, device 300 could also include a plurality of electrical contacts (not shown), such as conductive material that extends through a drilled hole between two layers of a circuit board (e.g., via) for instance. The electrical contacts may couple the first plurality of conductive structures to the second plurality of conductive structures to define one or more conductive coils extending around the axis of rotation to overlap the circular arrangement of magnet(s) 320 of the first platform. Circuitry 350 (and/or controller 334) can then cause one or more electrical currents to flow through the one or more coils to generate a second-platform magnetic field extending within the one or more coils. The first-platform magnetic field could then interact with the second-platform magnetic field to provide a force or torque acting on platform 310. The induced force may then cause platform 310 to rotate about the axis of rotation thereof. Further, in some instances, circuitry 350 (and/or controller 334) can modulate the second-platform magnetic field by adjusting the electrical current(s) flowing through the coil(s). By doing so, for instance, device 300 can control a direction or rate of rotation of platform 310 about the axis of rotation.

Accordingly, circuitry 350 may include any combination of wiring, conductive material, capacitors, resistors, amplifiers, filters, comparators, voltage regulators, controllers, and/or any other circuitry arranged to provide and modulate electrical current(s) flowing through conductive structures 340. For instance, circuitry 350 may be configured to condition the electrical current(s) to modify the second-platform magnetic field and thereby achieve certain rotation characteristics (e.g., direction, speed, etc.) for rotating platform 310.

Magnetic field sensor 390 may be configured to measure one or more characteristics (e.g., direction, angle, magnitude, flux density, etc.) of the first-platform magnetic field associated with magnet(s) 320. For example, sensor 390 may include one or more magnetometers arranged to overlap magnet(s) 320 and/or the first-platform magnetic field. A non-exhaustive list of example sensors includes proton magnetometers, Overhauser effect sensors, cesium vapor sensors, potassium vapor sensors, rotating coil sensors, Hall effect sensors, magneto-resistive device sensors, fluxgate magnetometers, superconducting quantum interference device (SQUID) sensors, micro-electro-mechanical-system (MEMS) sensors, and spin-exchange relaxation-free (SERF) atomic sensors, among other examples. In one implementation, sensor 390 may comprise a three-dimensional (3D) Hall effect sensor that outputs an indication of an angle (and/or magnitude) of the first-platform magnetic field at a position of sensor 390 according to an orthogonal coordinate system representation (e.g., x-y-z axis components) or other vector field representation.

Thus, device 300 could use output(s) from sensor 390 as a basis for determining an orientation or position of platform 310 about the axis of rotation. By way of example, sensor 390 can be positioned to overlap a portion of the first-platform magnetic field extending between two adjacent magnets of magnet(s) 320. As first platform 310 rotates, for instance, the angle of the portion may change at the position of sensor 390 and thus circuitry 350 (and/or controller 334) can sample the outputs from sensor 390 to deduce the position of sensor 390 relative to the two adjacent magnets.

Thus, with this arrangement, device 300 could use magnet(s) 320 as component(s) for both actuating platform 310 and measuring the orientation of platform 310 (e.g., magnetic encoder). This arrangement can provide an actuator and a magnetic encoder with reduced costs and with a more compact design.

Additionally, in some implementations, sensor 390 can be positioned along a circular path that intersects with the coil(s) defined by structures 340. For example, two particular structures in structures 340 can be spaced apart by a given distance greater than a uniform distance between other adjacent structures in structures 340. Further, sensor 390 can be positioned between these two particular structures. With this arrangement, for instance, interference due to the second-platform magnetic field with measurements of the first-platform magnetic field by sensor 390 can be mitigated, while also placing sensor 390 at a close distance to magnet(s) 320.

In implementations where magnet(s) 320 include index magnet 322, a particular portion of the first-platform magnetic field extending between index magnet 322 and one or more magnets adjacent to index magnet 322 may have one or more differentiating characteristics relative to other portions of the first-platform magnetic field. By of example, if index magnet 322 is positioned at a different distance to the axis of rotation of platform 310 than a substantially uniform distance between the axis of rotation and other magnets of magnet(s) 320, then a direction of the particular portion of the first-platform magnetic field may differ from respective directions of the other portions. Accordingly, in some examples, circuitry 350 (and/or controller 334) can associate detection of this difference with an orientation of platform 310 where sensor 390 overlaps index magnet 322 or a region between index magnet 322 and an adjacent magnet. Through this process, for instance, device 300 can map outputs of sensor 390 to a range of orientations of platform 310 relative to a position of index magnet 322.

In some implementations, device 300 may include fewer components than those shown. For example, device 300 can be implemented without index magnet 322, sensor 390, and/or any other component shown. Further, in some implementations, device 300 may include one or more components in addition to or instead of those shown. For example, platforms 310 and/or 340 may include additional or alternative sensors (e.g., microphone 256, etc.), computing subsystems (e.g., navigation system 248, etc.), and/or any other component such as any of the components of vehicles 100 and 200. Additionally, it is noted that the various functional blocks shown can be arranged or combined in different arrangements than those shown. For example, some of the components included in platform 310 can be alternatively included in platform 330 or implemented as separate components of device 300.

Figure 4A:
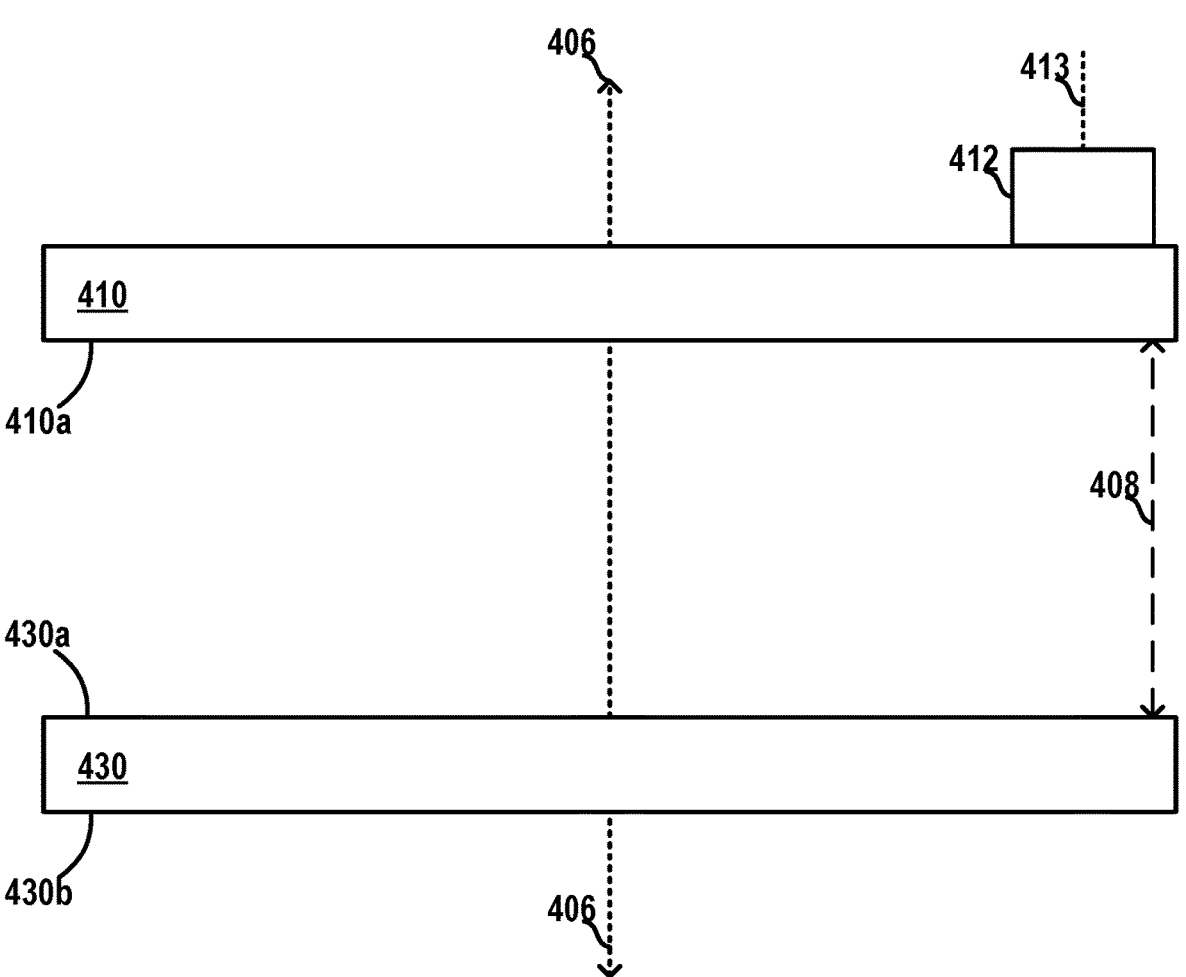
FIG. 4A illustrates a side view of a device that includes a rotary joint, according to an example embodiment.

FIG. 4A illustrates a side view of a device 400 that includes a rotary joint, according to an example embodiment. For example, device 400 may be similar to device 300, and can be used with an electromechanical system such as vehicles 100 and 200. As shown, device 400 includes a rotor platform 410 and a stator platform 430 that may be similar, respectively, to platforms 310 and 330. Further, as shown, device 400 includes an orientation sensor 412 disposed on platform 410. For example, sensor 412 may be similar to sensor 312.

Sensor 412 may include any orientation or direction sensor configured to provide sensor output signals indicative of an orientation (or a rate of change thereto) of orientation sensor 412 about reference axis 413. For example, sensor 412 may include a gyroscope sensor. As shown, sensor 412 is mounted on platform 410 such that reference axis 413 of sensor 412 is aligned with (e.g., parallel to) the axis 406 of the rotation of platform 410. With this arrangement for example, the measurements of the rate of change to the orientation of orientation sensor 412 indicated by the sensor output signals may also correspond to the rate of rotation of platform 410 about axis 406.

In some examples, sensor 412 can be configured as a yaw sensor to provide an indication of a direction of motion of a vehicle (or rate of change thereof). By way of example, consider a scenario where device 400 is mounted to vehicle 100 axis 413 shown in FIG. 4A corresponds to or is parallel to yaw axis 114 of vehicle 100 shown in FIG. 1B. With this arrangement, the sensor output signals of sensor 412 may be indicative of a yaw direction (or a change thereto) of vehicle 100. Continuing with the scenario above, an initial yaw direction of sensor 412 may correspond to a direction that is perpendicular to axis 413 and pointing out of the page. In this scenario, if vehicle 100 rotates about axis 114, then sensor 412 may experience a similar rotation about axis 413; and thus an orientation of sensor 412 ("yaw sensor") about axis 413 may change similarly to a change to the yaw direction of the vehicle about yaw axis 114.

Alternatively or additionally, in other examples, sensor 412 can be configured as a pitch sensor (e.g., by aligning axis 413 with axis 116 of vehicle 100), or a roll sensor (e.g., by aligning axis 413 with axis 118 of vehicle 100).

In the example shown, a side 410a of platform 410 is positioned within a given distance 408 to a side 430a of platform 430. Platform 410 can be configured as a rotor platform that rotates about axis of rotation 406. Further, platform 430 can be configured as a stator platform that remains within distance 408 to platform 410 in response to rotation of platform 410 about axis 406. In some examples, side 410a may correspond to a planar mounting surface of platform 410 (e.g., an outer layer of a circuit board). Similarly, for example, side 430a may correspond to a planar mounting surface of platform 430. It is noted that some components of device 400 are omitted from FIG. 4A for convenience in description.

Figure 4B:
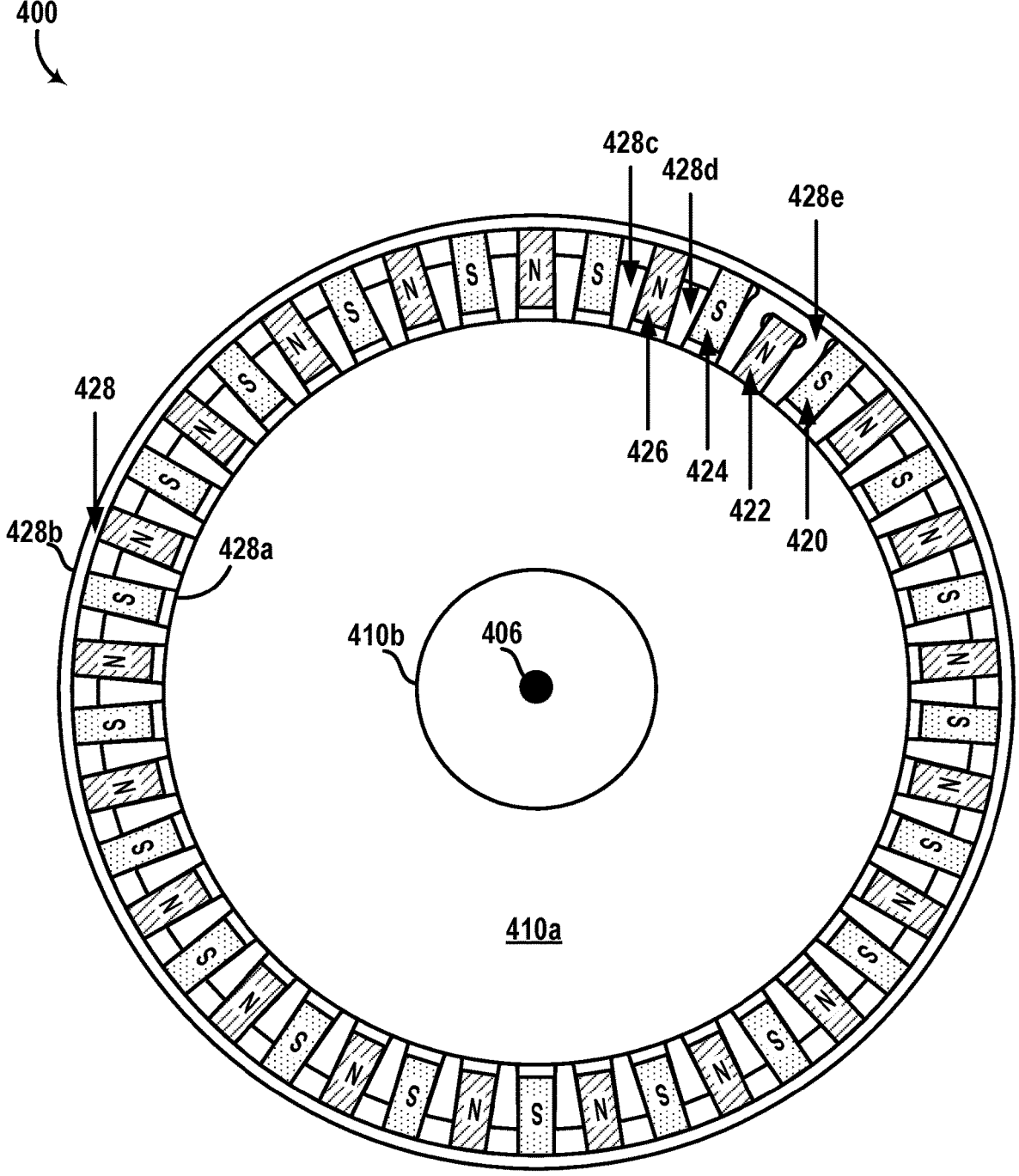
FIG. 4B illustrates a cross-section view of the device in FIG. 4A.

In the cross section view shown in FIG. 4B for instance, side 410a of platform 410 is pointing out of the page. As shown in FIG. 4B, device 400 also includes a plurality of magnets, exemplified by magnets 420, 422, 424, 426, and a mount 428.

Magnets 420, 422, 424, 426, can be similar to magnet(s) 320. For example, as shown, magnets 420, 422, 424, 426, are mounted in a substantially circular arrangement around axis of rotation 406. In some examples, like magnet(s) 320, adjacent magnets of the plurality of magnets (e.g., 420, 422, 424, 426, etc.) can be respectively magnetized in alternating directions. For example, as shown, magnet 420 is magnetized in a direction pointing into the page (e.g., South Pole indicated by letter "S" pointing out of the page), magnet 422 is magnetized in a direction pointing out of the page (e.g., North Pole indicated by letter "N" pointing out of the page), magnet 424 is magnetized in the same direction as magnet 420, and so on. Thus, in some examples, the respective magnetization directions of the plurality of magnets (e.g., 420, 422, 424, 426, etc.) could be substantially parallel to axis 406, as shown.

Mount 428 may include any structure configured to support the plurality of magnets (e.g., 420, 422, 424, 426, etc.) in a circular arrangement around axis of rotation 406. To that end, mount 428 may include any solid structure (e.g., plastic, aluminum, other metal, etc.) suitable for supporting the plurality of magnets in the circular arrangement. For example, as shown, mount 428 can have a ring shape extending between (circular) edges 428a and 428b. Further, as shown, mount 428 may include indentations that accommodate the plurality of magnets in the circular arrangement. For instance, as shown, mount 428 includes an indentation (between walls 428c and 428d) shaped to accommodate magnet 426. Thus, during assembly for instance, the plurality of magnets could be fitted into respective indentations of mount 428 to facilitate placing the plurality of magnets in the circular arrangement. Further, as shown, ring-shaped mount 428 could be concentrically arranged relative to axis 406 (e.g., axis 406 aligned with a center axis of ring-shaped mount 428). Thus, for instance, circular edges 428a, 428b, and magnets 420, 422, 424, 426, etc., could remain within respective given distances to axis 406 in response to rotation of platform 410 about axis 406.

In some examples, similarly to index magnet 322, at least one magnet in device 400 can be configured as an index magnet having one or more characteristics that differ from a common characteristic of other magnets. As shown, for example, magnet 422 is mounted at a different distance to axis 406 than a distance between other magnets (e.g., 420, 424, 426, etc.) and axis 406. To facilitate this, as shown, an indentation (e.g., defined by wall 428e extending around the indentation) that accommodates index magnet 422 could have a smaller length than respective indentations accommodating magnets 420, 424, 426, etc. As a result, index magnet 422, when mounted, may be closer to edge 428a (and axis 406) than magnets 420, 424, 426, etc.

It is noted that platform 410 may include additional components to those shown in FIG. 4B. In one implementation, mount 428 can be arranged along a periphery of a printed circuit board (PCB) or other circuit board. In another implementation, mount 428 can be disposed along a surface or layer of the circuit board. Regardless of the implementation, for example, the region of side 410a between axis 406 and edge 428a can be used to mount one or more components such as any of the components of platform 310.

In one example, as shown, platform 410 may include a center gap defined by edge 410b. In this example, platform 410 may include a transformer coil (not shown) arranged around edge 410b. Further, in this example, device 400 may include a magnetic core (not shown) extending through the center gap to guide a magnetic flux generated by a similar transformer coil (not shown) of platform 430. Thus, for instance, power can be transmitted between the two platforms 410 and 430, in line with the discussion above for power interfaces 318 and 338. In another example, platform 410 may include one or more wireless transmitters or receivers (e.g., light sources, light detectors, antenna, etc.) in the region of platform 410 between edges 428a and 410b. Thus, similarly to device 300 for example, device 400 can be configured to transmit power and/or communication signals between platforms 410 and 430.

Figure 4C:
FIG. 4C illustrates another cross-section view of the device in FIG. 4A.

In the cross section view shown in FIG. 4C, side 430a of platform 430 is pointing out of the page. The cross section view of platform 430 shown in FIG. 4D may correspond to a view of a layer of platform 430 that is substantially parallel to side 430a. Referring back to FIG. 4A by way of example, the layer shown in FIG. 4D may correspond to a layer between sides 430a and 430b. In another example, the layer shown in FIG. 4D may correspond to conductive materials patterned on side 430b of platform 430. In one implementation, platform 430 can be physically implemented as a multi-layer circuit board (e.g., PCB) or may comprise a multi-layer PCB embedded therein. To that end, one or more components shown in FIG. 4C may correspond to electrically conductive material(s) (e.g., tracks, traces, copper, etc.) patterned along an outer layer of the PCB, and one or more components shown in FIG. 4D may correspond to electrically conductive material(s) patterned along another layer of the PCB. Other implementations are possible as well.

Figure 4D:
FIG. 4D illustrates yet another cross-section view of the device in FIG. 4A.

As shown in FIGS. 4C and 4D, device 400 also includes a plurality of power leads, exemplified by leads 432, 434, 436, 438, a first plurality of adjacent conductive structures, exemplified by structures 442, 444, 446, 448, 450, 452, 454, 456, 458, 459, a second plurality of adjacent conductive structures, exemplified by structures 472, 474, 476, 478, 480, 482, 484, 486, 489, a plurality of electrical contacts, exemplified by contacts 462, 464, 466, 468, a magnetic field sensor 490, and connectors 492, 494.

Power leads 432, 434, 436, 438, etc., may be configured to electrically couple, respectively, one or more of the first and second pluralities of conductive structures to a power source, voltage regulator, current amplifier, or other circuitry (e.g., circuitry 350) that provides or conditions one or more electrical currents flowing through the respective conductive tracks coupled to the respective leads.

The first plurality of conductive structures (442, 444, 446, 448, 450, 452, 454, 456, 458, 459, etc.) may comprise electrically conductive material (e.g., copper, etc.) in a circular arrangement around axis 406, similarly to conductive structures 340. For instance, as shown in FIG. 4C, the first plurality of conductive structures extends between circles 440 and 441, which are concentric to axis 406. A region of side 430a between circles 440 and 441, for instance, may at least partially overlap the plurality of magnets 420, 422, 424, 426, etc., of rotor platform 410. Further, as shown in FIG. 4C, each conductive structure (e.g., structure 442, etc.) is tilted relative to a radius of circle 440 (and 441) where the respective structure intersects with circle 440. In addition, the first plurality of conductive structures is in a substantially coplanar arrangement. Thus, for instance, structures 442, 444, 446, 448, 450, 452, 454, 456, 458, 459, etc. can be formed as patterned conductive tracks along a single layer of a circuit board (e.g., PCB).

Similarly, in FIG. 4D, the second plurality of conductive structures (472, 474, 476, 478, 480, 482, 484, 486, 488, 489, etc.) are in a circular arrangement that is substantially coplanar (e.g., along a second layer of the PCB). Thus, for example, the first plurality of conductive structures may be at a first distance to the plurality of magnets (420, 422, 424, 426, etc.) that is less than a second distance between the second plurality of structures and the plurality of magnets.

Additionally, structures 472, 474, 476, 478, 480, 482, 484, 486, 488, 489, etc. extend, respectively, between circles 470 and 471. Circles 470 and 471 may be similar to circles 440 and 441, for example, and may thus be concentric to axis 406 with similar radii, respectively, as the radii of circles 440 and 441. Further, each conductive structure (e.g., structure 472, etc.) in FIG. 4D is positioned at a tilting angle relative to a radius of circle 470 (and 471) where the respective structure intersects with circle 470. However, the second plurality of structures in FIG. 4D are at an opposite tilting angle to the tilting angle of the first plurality of structures of FIG. 4C. For example, structure 442 (FIG. 4C) is shown to tilt away from circle 440 in a clockwise direction. Whereas, structure 472 (FIG. 4D) is shown to tilt away from circle 470 in a counterclockwise direction.

To facilitate electrically coupling between the first plurality of structures (442, 444, 446, 448, 450, 452, 454, 456, 458, 459, etc.) and the second plurality of structures (472, 474, 476, 478, 480, 482, 484, 486, 488, 489, etc.), electrical contacts 462, 464, 466, 468, etc., may comprise conductive material that extends through the PCB in a direction perpendicular to the page (e.g., vias) to connect respective conductive structures that overlap at the respective positions of the respective contacts. For example, contact 462 electrically couples conductive structure 442 (FIG. 4C) to conductive structure 472 (FIG. 4D), contact 464 electrically couples conductive structure 444 (FIG. 4C) to conductive structure 474 (FIG. 4D), etc.

With this arrangement, the conductive structures in both layers of platform 430 may form one or more conductive paths that extend around axis 406. For example, a first current can flow through a first conductive path that comprises, in this order: lead 432, structure 442, contact 462, structure 472, contact 466, structure 446, etc., until the first current arrives at lead 436. Thus, for example, the first current can flow from structure 442 to structure 472 without flowing through adjacent structure 444. Similarly, for example, a second current can flow through a second conductive path that comprises, in this order: lead 434, structure 444, contact 464, structure 474, contact 468, structure 448, etc., until the second current arrives at lead 438. Thus, the first conductive path may form a first coil that extends around axis 406, and the second conductive path may form a second coil that extends around axis 406.

In some implementations, leads 432, 434, etc., of the first layer shown in FIG. 4C can be connected (directly or indirectly) to a first terminal of a power source (not shown), and leads 436, 438, etc., of the second layer shown in FIG. 4D can be connected to a second terminal of the power source. As a result, in these implementations, each coil or conductive path of platform 430 may carry a portion of a same electrical current. For instance, each coil in these implementations may be connected to other coils in a parallel circuit configuration.

Regardless of the implementation, when electrical current(s) are flowing through the first and second pluralities of coplanar conductive structures, a stator-platform magnetic field is generated through the coil(s) formed by the electrically coupled conductive structures. The stator-platform magnetic field could then interact with the rotor-platform magnetic field associated with the magnets in rotor platform 410 to cause a torque or force that rotates platform 410 about axis 406. The stator-platform magnetic field, for example, may extend within the coil(s) defined by the first and second conductive paths described above in a clockwise or counterclockwise direction depending on a direction of the respective electrical currents flowing through the respective conductive paths (or coils).

Thus, in some examples, the conductive structures shown in FIGS. 4C and 4D can be electrically coupled to form a coreless PCB motor coil. For instance, the first plurality of conductive structures shown in FIG. 4C can be separated from the second plurality of conductive structures shown in FIG. 4D by an insulating material, such as an electrically insulating layer (e.g., plastic, etc.) between the two layers shown in FIGS. 4C and 4D. In this instance, the stator-platform magnetic field could extend through the insulating material. However, in other examples, a magnetically permeable core (not shown) can be inserted between the two layers of FIGS. 4C and 4D to direct the generated stator-platform magnetic field. For instance, a middle layer (not shown) of platform 430 may include conductive material disposed between the two layers of FIG. 4C and 4D. In this instance, the conductive material in the middle layer could also overlap the first plurality of conductive structures and the second plurality of conductive structures. As a result, the conductive material in the middle layer may thus be configured as a magnetic core that enhances the stator-platform magnetic field by directing the stator-platform magnetic field inside coil(s) defined by the respective conductive path(s) extending around axis 406 and along the two layers shown in FIGS. 4C and 4D.

Magnetic field sensor 490 may be similar to sensor 390. To that end, sensor 490 may include any magnetometer, such as a Hall effect sensor, etc., that is configured to measure the rotor-platform magnetic field generated by the magnets (e.g., 420, 422, 424, 426, etc.) of platform 410. Thus, for instance, a computing system (e.g., controller 334, circuitry 350, etc.) can determine an orientation of platform 410 about axis 406 based on outputs from sensor 490.

To facilitate this, in some examples, sensor 490 can be positioned at a location in platform 430 that substantially overlaps the rotor-platform magnetic field of platform 410. For example, as shown in FIG. 4C, sensor 490 is positioned in the region between circles 440 and 441 (the region that at least partially overlaps the magnets of platform 410). Additionally, to mitigate interference due to the stator-platform magnetic field extending between the coils or conductive paths defined by the first and second pluralities of conductive structures, a portion of the coil-shaped conductive path extending around axis 406 in platform 430 could be interrupted or modified in the region of platform 430 where sensor 490 is located.

As shown in FIG. 4C, for example, the first plurality of conductive structures comprise a plurality of spaced-apart conductive structures that are spaced apart by a substantially uniform distance. For instance, as shown, structures 442, 444 are separated by the substantially uniform distance, and structures 446, 448 are also separated by the substantially uniform distance. Further, the first plurality of conductive structures shown in FIG. 4C may include two adjacent structures that are separated by a greater distance than the substantially uniform distance. For instance, as shown, adjacent structures 454 and 456 are separated by the greater distance. Similarly, for example, the second plurality of conductive structures (shown in FIG. 4D) also includes two adjacent structures (e.g., 484, 486) that are separated by a greater distance than the substantially uniform distance between other structures of the second plurality of structures. Thus, as shown in FIG. 4C, sensor 490 can be located between structures 454 and 456 (i.e., within the "gap" in the coil-shaped conductive path(s) extending around axis 406).

To facilitate this arrangement, connectors 492 and 494, which extend away from the region where sensor 490 is located (e.g., outside the region between circles 440 and 441, etc.), can be employed to electrically couple a portion of the coil-shaped conductive path(s) and a remaining portion of the coil-shaped conductive path(s). To that end, connectors 492 and 494 may comprise conductive material (e.g., copper, metal, metal compound, etc.) that is shaped and/or disposed at an appropriate distance from sensor 490 to reduce the effect of the stator-platform magnetic field at a location of sensor 490.

As shown, for instance, connector 492 electrically couples, via an electrical contact, conductive structure 454 (FIG. 4C) to conductive structure 489 (FIG. 4D). Similarly, connector 494 electrically couples conductive structure 484

(FIG. 4D) to conductive structure 459 (FIG. 4C). Although not shown, platform 430 may also include additional connectors (e.g., similar to connectors 492 or 494) that are configured to electrically connect additional conductive paths around axis 406 while reducing the stator-platform magnetic field at the location of sensor 490. In a first example, a connector (not shown) could electrically couple structure 452 (FIG. 4C) to structure 488 (FIG. 4D). In a second example, a connector (not shown) could electrically couple structure 450 (FIG. 4C) to structure 486 (FIG. 4D). In a third example, a connector (not shown) could electrically couple structure 480 (FIG. 4D) to structure 456 (FIG. 4C). In a fourth example, a connector (not shown) could electrically couple structure 482 (FIG. 4D) to structure 458 (FIG. 4C).

Further, although connectors 492 and 494 are shown to be disposed along a same PCB layer (e.g., side 430a), in some examples, one or more connectors can be alternatively disposed along the layer shown in FIG. 4D or another layer (not shown) of platform 430. Further, although magnetic sensor 490 is shown to be mounted to side 430a of platform 430, in some examples, sensor 490 can be alternatively positioned along a different side (e.g., side 430b) of platform 430 or any other position within a portion of the rotor-platform magnetic field between conductive structures 454, 456, 484, 486. For instance, in an implementation where the second plurality of conductive structures 472, 474, 476, 478, 480, 482, 484, 486, 488, 489, etc. are disposed along side 430b of platform 430, sensor 490 can be alternatively mounted between structures 484 and 486. Other positions for sensor 490 are possible as well (e.g., between sides 430a and 430b, etc.).

Further, in some examples, platform 430 may include more components than those shown, such as any of the components (e.g., communication interface 335, power interface 338, etc.) included in platform 330 for instance. Referring back to FIG. 4C by way of example, platform 430 can be implemented as a circuit board (e.g., PCB), and the region between axis 406 and circle 440 can include power interface components (e.g., transformer coils), and/or communication interface components (e.g., wireless transmitters, light sources, detectors, etc.), among other possibilities.

It is noted that the shapes, dimensions, and relative positions shown in FIGS. 4A-4D for device 400 and/or components thereof are not necessarily to scale and are only illustrated as shown for convenience in description. To that end, for example, device 400 and/or one or more components thereof can have other forms, shapes, arrangements, and/or dimensions as well. It is also noted that device 400 may include fewer or more components than those shown, such as any of the components of device 300 (e.g., interfaces, sensors, controllers, etc.), among others. In one example, although six leads are shown for each layer of FIGS. 4C and 4D, device 400 could alternatively include more or fewer leads for a different number of conductive paths extending around axis 406. In another example, although device 400 is shown to include a particular number of magnets in platform 410, device 400 can alternatively include more or fewer magnets.

Figure 5:
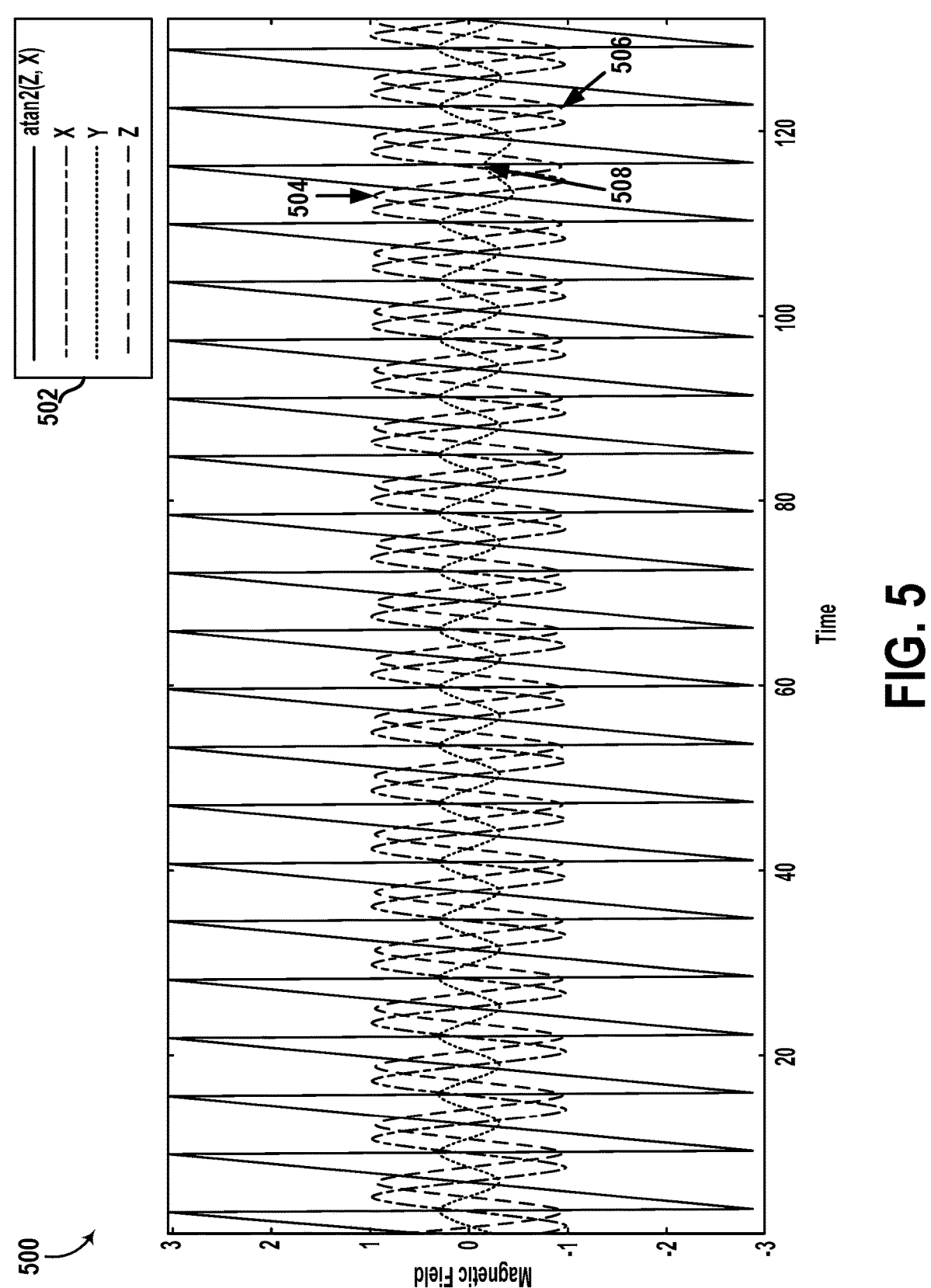
FIG. 5 is a conceptual illustration of the relationship between orientations of a rotor platform and outputs from a magnetic field sensor, according to an example embodiment.

FIG. 5 is a conceptual illustration 500 of the relationship between orientations of a rotor platform and outputs from a magnetic field sensor, according to an example embodiment. FIG. 5 illustrates a scenario where rotor platform 410 is rotated for a complete rotation at a constant rate and in a clockwise direction about axis 406. To that end, the horizontal axis of the plot in illustration 500 may indicate time (e.g., in seconds) from an initial orientation of platform 410 until platform 410 rotates for a complete (e.g., 360 degree) rotation about axis 406. In the scenario, sensor 490 may be configured to provide a 3D representation of the rotor-platform magnetic field at a location of sensor 490 (e.g., vector field). Thus, the X-curve, Y-curve, and Z-curve indicated in legend 502 may correspond, respectively, to an x-component, y-component, and z-component of the measured magnetic field by sensor 490. To that end, for plots X, Y, Z, the vertical axis of the plot in illustration 500 may indicate measured magnetic fields (e.g., in Teslas). Further, the curve "atan2(Z, X)" indicated in legend 502 may correspond to a computed magnetic field angle based on an application of the "atan2" function to the z-component and x-component of the output. The atan2 computation may be similar to computing an arc tangent of: the z-component output divided by the x-component output. However, unlike the arc tangent computation, the atan2 function provides an output angle in radians between the positive x-axis of a plane and the point given by the co-ordinates (X, Z) on the plane. For example, an atan2 computed angle may comprise a positive value for counter-clockwise angles (e.g., Z>0), and a negative value for clock-wise angles (e.g., Z<0). By doing so, unlike a simple arc tangent computation, atan2 can provide an output in the range of $-\pi$ Radians to $\pi$ Radians, while also avoiding the issue of division by zero (e.g., where the value of the x-component is zero). To that end, as shown for the curve of "atan2(Z, X)," the vertical axis may indicate an angular computation (e.g., in Radians).

Referring back to FIG. 4C, the y-component indicated by the Y-curve may correspond to a component of the rotor-platform magnetic field that is along a y-axis extending through sensor 490 toward axis 406. The z-component indicated by the Z-curve may correspond to a component of the rotor-platform magnetic field that is along a z-axis extending through sensor 490 and out of the page. The x-component indicated by the Z-curve may correspond to a component of the rotor-platform magnetic field along an x-axis of sensor 490 that is perpendicular (e.g., orthogonal) to the y-axis and the z-axis.

With this configuration, for instance, the maxima of the Z-curve shown in illustration 500 may correspond to orientations of platform 410 where sensor 490 is aligned with a magnet that is magnetized in a positive direction of the z-axis (e.g., South Pole pointing out of the page). For example, the z-maximum at arrow 504 indicates an orientation of platform 410 where magnet 420 is aligned with sensor 490. Further, the minima of the Z-curve may correspond to orientations of platform 410 where sensor 490 is aligned with a magnet that is magnetized in a negative direction of the z-axis (e.g., North Pole pointing out of the page). For example, the z-minimum at arrow 506 indicates an orientation of platform 410 where magnet 426 is aligned with sensor 490.

Thus, with this arrangement, an indication of the orientation of platform 410 between two adjacent magnets can be computed (e.g., the "atan2(Z, X)" curve) as the atan2 computation for: the z-component and the x-component. This computation, for example, can be performed by controller 334 and/or circuitry 350. The atan2(Z, X) curve represents a normalized orientation of platform 410 between any two magnets. For example, each orientation of platform 410 where sensor 490 is aligned with a magnet may correspond to a value of zero radians or a value of pi radians (depending on the direction of the z-axis). Thus the various devices and systems herein (e.g., vehicles 100, 200, devices 300, 400) can use the atan2(Z, X) computation as a mapping for orientations of platform 410 relative to any two magnets.

Further, as noted above, an index magnet can be used to facilitate computing an absolute orientation of platform 410 about axis 406. Referring back to FIG. 4C by way of example, index magnet 422 is positioned at an offset distance to axis 406 (i.e., an offset along the y-axis of sensor 490) compared to other magnets (e.g., 420, 424, 426, etc.) of platform 410. As a result, for example, the y-component of the rotor-platform magnetic field measured by sensor 490 may experience an anomaly for orientations of platform 410 where sensor 490 overlaps a region between magnets 420 and 424. Arrow 508 points to a y-maximum that is associated with the sensor 490 being in such region (e.g., between magnets 420 and 424). As shown, the y-maximum 508 is significantly lower than other y-maxima of the Y-curve in illustration 500. Thus, the y-component anomaly can be used by device 400 to detect an index position of platform 410, and then map other positions between different pairs of magnets as absolute orientations of platform 410 relative to the index position or orientation.

Further, as shown, the y-component anomaly is substantially independent from the x-component and z-component measurements. Thus, the y-axis displacement of index magnet 422 can allow device 400 to measure the orientation of platform 410 (e.g., using the x-component and z-component), while also detecting the index orientation using the y-component.

Figure 6:
FIG. 6 is a cross-section view of another device that includes a rotary joint, according to an example embodiment.

FIG. 6 is a cross-section view of another device 600 that includes a rotary joint, according to an example embodiment. For example, device 600 may be similar to devices 300 and 400. To that end, device 600 includes a rotor platform 610 having a side 610a, that are similar, respectively, to rotor platform 410 and side 410a. Further, as shown, device 600 includes an axis of rotation 606, magnets 620, 624, 626, and mount 628, that are similar, respectively, to axis 406, magnets, 420, 424, 426, and mount 428.

As noted above, in some examples, index magnet 422 may have alternative or additional differentiating characteristics other than a displacement along the y-axis of sensor 490 (i.e., distance to axis 406). For example, unlike index magnet 422, index magnet 622 is at a same distance to axis 606 as other magnets (e.g., 620, 624, 626, etc.) of platform 610. However, as shown, index magnet 622 has a smaller size (e.g., length) compared to the other magnets. As a result, index magnet 622 may also exhibit an anomaly (e.g., similar to y-maximum 508) that allows device 600 to identify an index orientation of platform 610 about axis 606.

Figure 7:
FIG. 7 is a cross-section view of yet another device that includes a rotary joint, according to an example embodiment.

FIG. 7 is a cross-section view of another device 700 that includes a rotary joint, according to an example embodiment. For example, device 700 may be similar to devices 300, 400, 600. To that end, device 700 includes a rotor platform 710 and a side 710a that are similar, respectively, to rotor platform 410 and side 410a. Further, as shown, device 700 includes an axis of rotation 706, magnets 720, 724, 726, and mount 728 that are similar, respectively, to axis 406, magnets, 420, 424, 426, and mount 428.

However, unlike index magnet 422, index magnet 722 is at a same distance to axis 706 as other magnets (e.g., 720, 724, 726, etc.) of platform 710. Instead, as shown, index magnet 722 is arranged adjacent to another magnet 723 (e.g., within the indentation that accommodates magnet 722 in the circular arrangement of magnets around axis 706). Further, magnet 723 could be magnetized in a direction opposite to a magnetization direction of magnet 722 (e.g., indicated by South Pole "S" pointing out of the page). Thus, magnet 723 may distort the magnetic field provided by index magnet 722 such that index magnet 722 exhibits an anomaly (e.g., similar to y-maximum 508) that allows device 700 to identify an index position or orientation of platform 710 about axis 706.

Alternatively, although not shown, magnets 722 and 723 can be implemented as a single magnet (e.g., printed magnet, etc.) that includes a portion that is magnetized along one direction (e.g., South Pole pointing out of page) and another portion that is magnetized along an opposite direction (e.g., North Pole pointing out of page).

Figure 8:
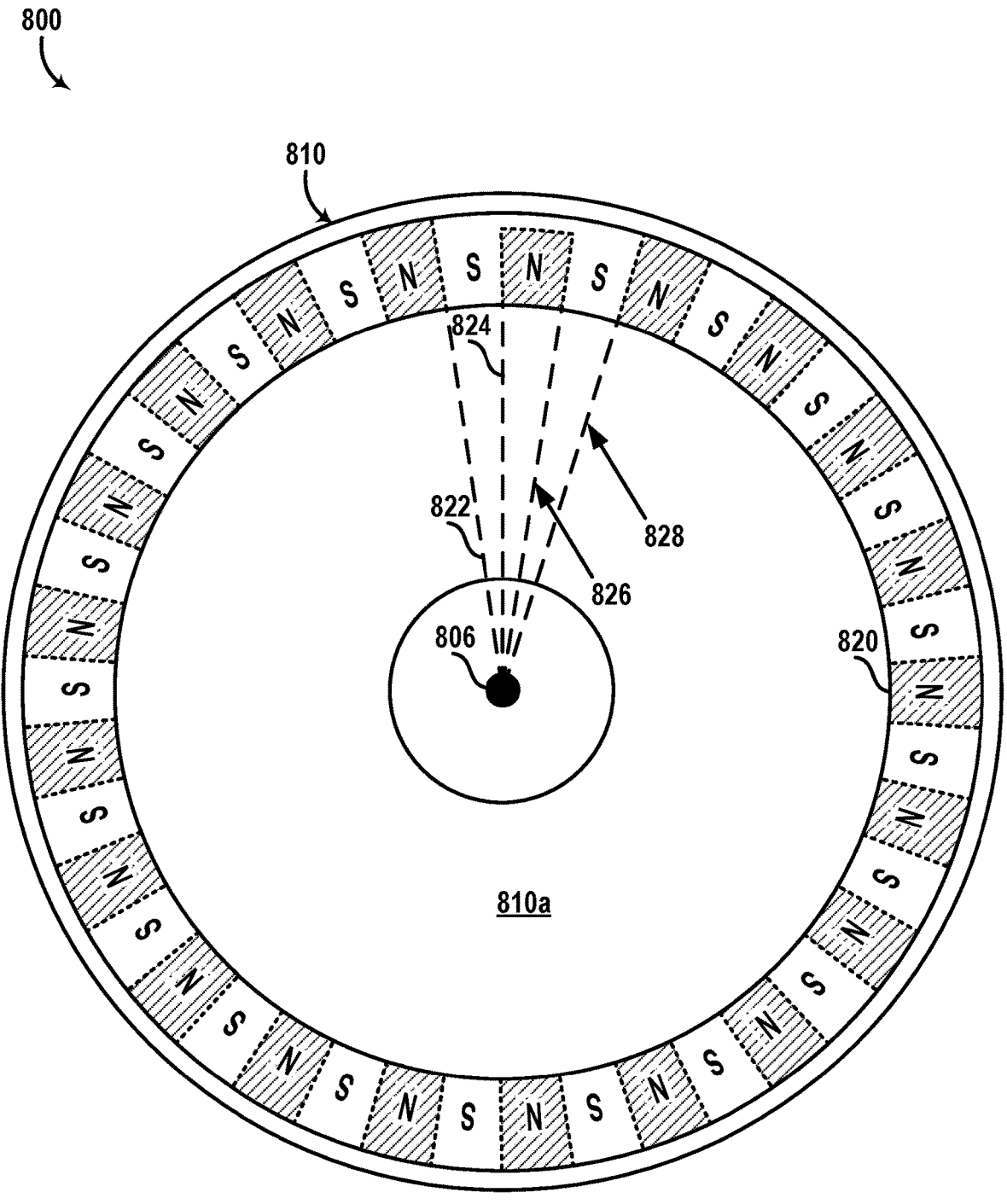
FIG. 8 is a cross-section view of still another device that includes a rotary joint, according to an example embodiment.

FIG. 8 is a cross-section view of another device 800 that includes a rotary joint, according to an example embodiment. For example, device 800 may be similar to devices 300, 400, 600, 700. To that end, device 800 includes a rotor platform 810 and a side 810a that are similar, respectively, to rotor platform 410 and side 410a. Further, as shown, device 800 includes an axis of rotation 806 that is similar to axis 406. As shown, device 800 also includes a ring magnet 820 that is similar to magnet 320.

As noted above, in some examples, magnet 320 can be implemented as a single ring magnet. Thus, as shown, ring magnet 820 is an example single magnet implementation that can be used instead of the plurality of magnets 420, 422, 424, 426, etc., of device 400. For example, ring magnet 820 can be physically implemented as a printed magnet that has a magnetization pattern similar to the arrangement of magnets in device 400 (e.g., adjacent regions of magnet 820 magnetized in alternating directions, etc.).

For example, a first ring sector (e.g., annulus sector, etc.) of ring magnet 820 may correspond to a region of magnet 820 having an angular width between radii 822 and 824. As shown, the first ring sector could be a magnetized region of ring magnet 820 that is magnetized in a first direction (parallel to axis 806) that is pointing into the page. This is illustrated by the white background of the first ring sector and the letter "S" (i.e., South Pole pointing out of the page). Similarly, for example, a second ring sector of ring magnet 820 (adjacent to the first ring sector) may correspond to a region of magnet 820 having an angular width between radii 824 and 826. Further, as shown, at least a portion of the second ring sector is magnetized in an opposite direction to that of the first ring sector. This is illustrated by the different background pattern of the second ring sector and the letter "N" (i.e., North Pole pointing out of the page).

Additionally, the second ring sector (between radii 824 and 826) shows an alternative implementation for index magnet 422. As shown, the region between radii 824 and 826 is configured as an index ring sector by magnetizing a portion of the index ring sector along a first direction (e.g., "N" North Pole pointing out of the page) and another portion of the index ring sector along an opposite direction (e.g., portion with a white background that has a same magnetization direction "S" South pole as adjacent ring sectors between radii 822, 824 and radii 826, 828). Thus, the index ring sector of ring magnet 820 illustrates an alternative "index magnet" implementation that can also provide an anomaly (e.g., similar to y-maximum 508) in an output of a magnetic field sensor (e.g., sensor 390, 490, etc.) to facilitate determining an absolute position or orientation of rotor platform 810 about axis 806.

Additionally, in an example scenario where magnet 820 replaces magnets 420, 422, 424, 426, etc. of device 400, conductive structures 442, 444, 446, 448, 450, 452, 454, 456, 458, 459, etc., may remain within distance 408 to magnet 820 in response to rotation of platform 410 about axis 406. Further, in the scenario, an electrically conductive path defined by one or more of the conductive structures could remain at least partially overlapping ring magnet 820 as platform 410 rotates about axis 406.

Figure 9:
FIG. 9 is a simplified block diagram of a sensor unit that includes an adjustable sensor platform, according to an example embodiment.

FIG. 9 is a simplified block diagram of a sensor unit device 900 that includes an adjustable sensor mounting platform 906, according to an example embodiment. Sensor unit 900 may be similar to sensor units 102, 104, 106, 108, 110, and/or any combination of the components in sensor system 204. As shown, sensor unit 900 includes one or more actuators 902, one or more encoders 904, a sensor platform 906, a temperature sensor 910, a conditioning device 912, and a controller 914. It is noted that sensor unit 900 may include additional or fewer components than those shown. In one example, sensor unit 900 may include any of the components of vehicle 200 in addition to or instead of the components shown. In another example, device 900 can be implemented without temperature sensor 910 and/or without conditioning device 912. Other examples are possible as well.

Actuator(s) 902 may include one or more actuators similar to actuator(s) 236. In one implementation, actuator 902 may be configured to rotate platform 906 about an axis of rotation that is substantially parallel to an axis of rotation of a vehicle (e.g., yaw axis, roll axis, pitch axis, etc.), and/or any other axis of rotation.

Encoder(s) 904 may include any combination of encoders (e.g., mechanical encoders, optical encoders, magnetic encoders, capacitive encoders, etc.), and may be configured to provide an indication of an orientation of platform 906 in response to actuator 902 rotating platform 906. Thus, in one example, encoder 904 may be configured to provide encoder output signals indicative of angular positions of platform 906 about an axis of rotation of platform 906.

In some examples, both actuator 902 and encoder 904 may include one or more shared physical components. By way of example, actuator 902 may include a plurality of magnets disposed on platform 906 (e.g., similarly to the magnets of device 400 shown in FIG. 4B), and a plurality of conductive structures disposed in another platform (not shown) of device 900 opposite to platform 906 (e.g., similarly to the conductive structures of device 400 shown in FIGS. 4C and 4D). Further, in this example, encoder 904 may also include the same plurality of magnets disposed on platform 906 together with a magnetic field encoder disposed on the other opposite platform (e.g., similarly to magnetic field sensor 490 shown in FIG. 4C).

Platform 906 may include any solid structure suitable for mounting a sensor (e.g., sensor 908). For example, platform 906 may include a rotor platform that rotates relative to a stator platform in a rotary joint configuration.

Sensor 908 may include any combination of the sensors included in sensor system 204. In some implementations, sensor 908 comprises an orientation sensor, such as a gyroscope for instance, that is mounted on platform 906 and aligned with a directional axis of a vehicle (e.g., axis 114, 116, or 118) to provide an indication of a direction of motion of the vehicle. For example, a gyroscope sensor 908 may provide an output signal that indicates a rate of change in a pointing direction of the gyroscope sensor (e.g., yaw direction, pitch direction, roll direction, etc.) in response to motion of the gyroscope (e.g., due to the rotation of platform 906 or motion of a vehicle that includes sensor unit 900). Thus, in various examples, sensor 908 can be configured as a "yaw sensor" that provides an indication of a yaw rate of rotation of the yaw sensor (e.g., rate of rotation of the sensor about axis 114 of vehicle 100), a "pitch sensor" that provides an indication of a pitch rate, or a "roll sensor" that provides an indication of a roll rate. Thus, in one example, orientation sensor 908 may be mounted on platform 906 and configured to provide sensor output signals indicative of an orientation (or a rate of change thereof) of orientation sensor 908.

Temperature sensor 910 may comprise any type of temperature sensor such as a thermometer, thermistor, thermocouple, resistance thermometer, silicon bandgap temperature sensor, among others. In some examples, temperature sensor 910 can be arranged adjacent or near sensor 908 to provide an indication of a temperature of sensor 908 and/or a temperature of air surrounding sensor 908. For example, temperature sensor 910 can be used during calibration to associate the measured temperature with the measurements provided by sensor 908.

Conditioning device 912 may comprise any type of temperature conditioning device such as an air conditioner, a heating element, a resistive heating element, an air cooling device, among other examples. In some implementations, conditioning device 912 can be arranged near and/or coupled to sensor 908 to adjust the temperature of the sensor. In one example, conditioning device 912 can be used to simulate different temperatures of operation during calibration of sensor 908 and thus allow a vehicle performing the calibration to obtain or generate calibration data that is suitable for various environmental conditions (e.g., temperatures) that are expected during operation of the vehicle. In another example, conditioning device 912 can be used to adjust a temperature of sensor 908 to a given temperature within a temperature range suitable for previously generated calibration data. For instance, device 900 could store calibration data that was collected when sensor 908 was at a particular temperature. Further, in this instance, device 900 may include or otherwise access an indication of a threshold range of temperatures in which the stored calibration data is suitable for mitigating measurement errors by sensor 908. Thus, in an example scenario, device 900 or a component thereof (e.g., controller 914) could detect (e.g., via temperature sensor 910) that a current temperature is outside the threshold range of temperatures, and responsively operate conditioning device 912 to adjust the temperature of sensor 908 to the given temperature within the threshold range of temperatures.

Controller 914 may include any combination of circuitry and/or computer logic executable to perform the functions of the various methods in the present disclosure. In one example, controller 914 can be implemented as one or more processors and data storage storing instructions executable by the one or more processors, similarly to the computer system 210 of vehicle 200. In another example, controller 914 can be implemented as digital and/or analog circuitry wired to perform the various functions of the present disclosure. Other implementations (e.g., combination of computer program logic and circuitry) are possible as well.

IV. Example Methods and Computer-Readable Media

Figure 10:
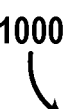
FIG. 10 is a flowchart of a method, according to an example embodiment.
Figure 10:
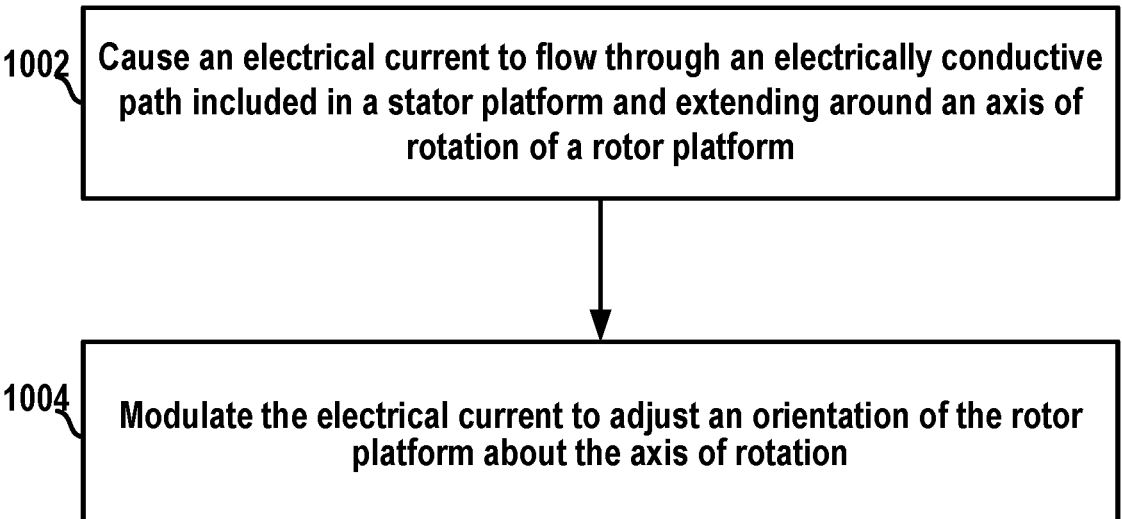

FIG. 10 is a flowchart of a method 1000, according to an example embodiment. Method 1000 shown in FIG. 10 presents an embodiment of a method that could be used with any of vehicles 100, 200, and/or devices 300, 400, 600, 700, 800, for example. Method 1000 may include one or more operations, functions, or actions as illustrated by one or more of blocks 1002-1004. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 1000 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 1000 and other processes and methods disclosed herein, each block in FIG. 10 may represent circuitry that is wired to perform the specific logical functions in the process.

Method 1000 is an example method for rotating a rotor platform (e.g., first platform 310, etc.) of a device (e.g., device 300, etc.) relative a stator platform (e.g., second platform 330, etc.) of the device and about an axis of rotation of the rotor platform (e.g., axis 406, etc.). Thus, in some examples, the rotor platform may remain within a given distance (e.g., distance 408, etc.) to the stator platform in response to rotation of the rotor platform about the axis of rotation, in line with the discussion above.

At block 1002, method 1000 involves causing an electrical current to flow through an electrically conductive path included in the stator platform and extending around the axis of rotation of the rotor platform. By way of example, device 300 may include circuitry 350 (e.g., power source(s), voltage regulator(s), current amplifier(s), wiring, etc.) that provides the electrical current to the electrically conductive path. To that end, for instance, the electrically conductive path may be defined by a first plurality of coplanar conductive structures (e.g., one or more of structures 442, 444, 446, 448, 450, 452, 454, 456, 458, 459, etc.) that are electrically coupled to one another. Further, for example, the electrically conductive path may also include a second plurality of coplanar conductive structures (e.g., one or more of structures 472, 474, 476, 478, 480, 482, 484, 486, 488, 489, etc.) that are parallel and electrically coupled to the first plurality of coplanar structures to form a coil extending around the axis of rotation.

Thus, as noted above, the electrical current flowing through the coil (i.e., arrangement of planar conductive structures) may generate a stator-platform magnetic field that interacts with a rotor-platform magnetic field of the rotor platform such that the rotor-platform rotates about the axis of rotation. For example, the interaction of the magnetic fields may induce a torque or force that causes the rotor platform to rotate about the axis of rotation in a clockwise or counterclockwise direction (depending on direction of the provided electrical current).

At block 1004, method 1000 involves modulating the electrical current to adjust an orientation of the first platform about the axis of rotation to achieve a target orientation. By way of example, consider a scenario where sensor 312 is a gyroscope (e.g., direction) sensor mounted on platform 310. In the scenario, a controller 314 (or 344) may be configured to process outputs from sensor 312 and rotate platform 310 until sensor 312 measures a specific target change in direction (e.g., a value of zero, etc.). In this scenario, circuitry 350 can modulate the electrical current to cause platform 310 to rotate in a particular direction and/or speed opposite to a change in direction or speed measured by sensor 312. Other scenarios are possible as well.

Thus, in some implementations, method 1000 also involves modulating a characteristic of the rotation of the rotor platform (e.g., rate of rotation, acceleration of rotation, direction of rotation, etc.). Additionally or alternatively, in some implementations, method 1000 also involves obtaining output of a magnetic field sensor (e.g., sensor 490), and determining an orientation of the rotor platform about the axis of rotation based on the output of the magnetic field sensor, in line with the discussion above.

FIG. 11 is a flowchart of another method 1100, according to an example embodiment. Method 1100 shown in FIG. 11 presents an embodiment of a method that could be used with any of vehicles 100, 200, devices 300, 400, 600, 700, 800, 900, and/or method 1000, for example. Method 1100 may include one or more operations, functions, or actions as illustrated by one or more of blocks 1102-1108. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1102, method 1100 involves generating a calibration control signal for controlling an actuator configured to rotate a first platform about an axis. The calibration control signal may cause the actuator to rotate the first platform at least one complete rotation about the axis. By way of example, a system of method 1100 may include a controller (e.g., computer system 210, controller 314, controller 334, controller 914, etc.) configured to generate the calibration control signal as a modulated electrical current that flows through the conductive structures of device 400 (shown in FIGS. 4C-4D) such that platform 410 (shown in FIG. 4A) rotates about axis 406 in a predetermined manner (e.g., at a particular rate of rotation and/or in a particular rotation direction during each complete rotation about the axis).

In some examples, causing the first platform to rotate a given complete rotation of the at least one complete rotation comprises the actuator causing the first platform to rotate from a particular angular position about the axis at a start time and position of the given complete rotation and in a particular direction of rotation until the first platform is at the particular angular position again at a stop time and position of the given complete rotation. Referring back to FIG. 4A, for example, the actuator may cause platform 410 to rotate in a clockwise direction from a particular angular position about axis 406 for 360 degrees (e.g., when platform 410 is back to that same particular angular position about axis 406, where start and stop positions are the same or directly adjacent to each other, etc.).

In some examples, the system of method 1100 may include a plurality of magnets mounted to the first platform and arranged around the axis of rotation of the first platform, similarly to the magnets of device 400 shown in FIG. 4B for example. In these examples, the plurality of magnets may generate a first magnetic field based on the arrangement of the plurality of magnets around the axis of rotation. Additionally, the system may include a second platform (e.g., platform 430 shown in FIG. 4A) configured to remain within a given distance (e.g., distance 408) to the first platform in response to the actuator rotating the first platform about the axis. Additionally, in some examples, the system may include a plurality of conductive structures disposed in the second platform and arranged around the axis of rotation, similarly to the conducting structures of device 400 shown in FIGS. 4C-4D. For instance, the plurality of conductive structures may form an electrically conductive path that extends around the axis of rotation based on the arrangement of the plurality of conductive structures, similarly to the conductive structures described for device 400. In these examples, the actuator of block 1102 may thus include the plurality of conductive structures of the second platform and the plurality of magnets of the first platform.

In some examples, method 1100 may also involve providing the calibration control signal (generated at block 1102) into the electrically conductive path defined by the plurality of structures. Thus, in these examples, the plurality of conductive structures may generate a second magnetic field based on the calibration control signal; and the first magnetic field of the first platform may interact with the second magnetic field of the second platform to cause the first platform to rotate about the axis.

At block 1104, method 1100 involves receiving, from an encoder (e.g., sensor 390, sensor 490, encoder 904, etc.), encoder output signals indicative of angular positions of the first platform about the axis. By way of example, a controller of LIDAR 400 may receive the encoder output signals from sensor 490, which may indicate which of the magnets shown in FIG. 4B overlaps sensor 490 during the rotation of platform 410 about axis 406.

In some examples, method 1100 involves detecting completion of each complete rotation of the at least one complete rotation of the first platform about the axis (e.g., caused by the actuator at block 1102) based on the encoder output signals.

In a first example, referring back to FIGS. 4B and 4C, a system of method 1100 may detect completion of each complete rotation of platform 410 about axis 406 when sensor 490 provides a particular encoder output signal that indicates presence of index magnet 422 above sensor 490 (i.e., when platform 410 is at an index angular position about axis 406).

In a second example, the system may detect the completion of each complete rotation of platform 410 based on sensor 490 providing a same particular encoder signal associated with a particular angular position at a start of the complete rotation and at the end of the complete rotation. Thus, the particular encoder signal does not necessarily have to be associated with an index position of platform 410 about axis 406.

More generally, some example encoder measurement errors may be systematic and repeatable (i.e., consistently occur in a particular manner during each complete rotation). For instance, an error caused by an offset in a mounting position of a particular magnet of the magnets shown in FIG. 4B relative to an expected mounting position may cause the same encoder measurement error each time sensor 490 overlaps that particular magnet while platform 410 is rotating. In another instance, an error associated with a circularity or concentricity of the arrangement of the magnets shown in FIG. 4B may also be substantially consistent during each complete rotation of platform 410 about axis 406. Thus, in some examples, the encoder output signals received at block 1104 may provide a relatively reliable and/or repeatable signal for detecting completion of each complete (360 degree) rotation of the first platform about the axis.

At block 1106, method 1100 involves receiving, from an orientation sensor mounted on the first platform, sensor output signals indicative of a rate of change to an orientation of the orientation sensor. Referring back to FIG. 4A for example, the sensor output signals at block 1106 may be provided by the sensor 412 that is disposed on platform 410. For instance, sensor 412 may include a gyroscope 412 that measures the rate of change to the orientation of gyroscope 412 about axis 413.

At block 1108, method 1100 involves determining, based on given output signals received from the orientation sensor during the at least one complete rotation, calibration data for mapping the encoder output signals to calibrated measurements of the angular positions of the first platform about the axis.

By way of example, a system of method 1100 can use the measurements from the orientation sensor indicated by the given sensor output signals to estimate given angular positions of the first platform during each of the at least one complete rotations caused by the actuator according to the calibration control signal. The system may then compare the estimated measurements of the angular positions indicated by the orientation sensor with corresponding measurements of the angular positions indicated by the encoder.

Ideally, both the sensor and encoder measurements should match one another. However, in some scenarios, the encoder measurements may include a variety of measurement errors. Referring back to FIG. 4B for example, the encoder measurements may include errors caused by a misalignment of one or more of the plurality of magnets mounted to platform 410 relative to expected positions of the magnets. As another example, the circularity of the arrangement of the magnets shown in FIG. 4B may be offset from an expected circularity. Other example sources of encoder measurement errors are possible, such as unexpected magnetic properties (e.g., polarization direction, magnetic field strength, etc.) among others. Thus, encoder output signals associated with such misaligned configurations may be different than expected encoder output signals associated with an aligned configuration of the various components of the encoder. Referring back to FIG. 5 for example, such misalignments may cause the magnetic field strengths indicated by the X, Y, and Z signals shown in FIG. 5 have different shapes than the substantially uniform sinusoidal signal shapes shown.

Accordingly, in some examples, a system of 1100 may determine the calibration data at block 1108 (e.g., look up table, fast-fourier-transform (FFT) coefficients, or any other type of calibration data) by mapping the apparent angular positions indicated by the encoder with corresponding estimated angular positions of the first platform indicated by the given sensor output signals from the orientation sensor.

In some examples, method 1100 involves estimating a rate of rotation of the first platform during the at least one complete rotation of the first platform about the axis based on the given sensor output signals; and modulating the calibration control signal based on the estimated rate of rotation. Referring back to FIG. 4A for example, a system of method 1100 may use the sensor output signals from orientation sensor 412 to drive the rate of rotation of platform 410 toward a target rate of rotation. In this way for instance, measurement errors (e.g., scale factor errors) associated with orientation sensor 412 can be controlled or reduced (e.g., by keeping the rate of change to the orientation of sensor 412 at or near a value of zero to reduce the scale factor errors). Accordingly, in some examples, modulating the calibration control signal optionally comprises modulating the calibration control signal based on a difference between the estimated rate of rotation and a target rate of rotation.

In some examples, method 1100 involves modulating the calibration control signal during the at least one complete rotation of the first platform about the axis based on the sensor output signals (received at block 1106) and the encoder output signals (received at block 1104). By way of example, a system of method 1100 can use the encoder output signals to monitor respective time periods between a start and end of each complete rotation (and thus control the rate of rotation during each respective time period); and also use the sensor output signals to control the uniformity of the rate of rotation of the first platform during each time period (e.g., by keeping the magnitude of the rate of change to the orientation of the orientation sensor near zero or other target rate, etc.).

In some examples, the encoder of block 1104 is a magnetic encoder. For instance, the magnetic encoder may include a plurality of magnets arranged around the axis of rotation of the first platform, similarly to the magnets of device 400 shown in FIG. 4B. Further, for instance, the magnetic encoder may also include a magnetic field sensor similar to sensor 490 shown in FIG. 4C. In these examples, method 1100 may also involve identifying a defect in the magnetic encoder based on the calibration data.

In a first example, identifying the defect in the magnetic encoder comprises identifying a particular magnet of the plurality of magnets that is positioned at an offset from an expected position of the particular magnet in the arrangement of the plurality of magnets around the axis of rotation. Referring back to FIG. 4B for example, if magnet 424 is at a different position than the position shown in FIG. 4B, then the magnetic field angles measured by sensor 490 between a first angular position when sensor 490 overlaps magnet 422 and a second angular position when sensor 490 overlaps 426 may not correspond to expected magnetic field angles that would be measured if magnet 424 was mounted at a correct position. Thus, a system of method 1100 may identify the offset between the actual position of magnet 424 and the expected position based on given encoder output signals indicated by sensor 490 between the first and second angular positions of platform 410. For instance, the system may compare the calibration data with previously collected calibration data to detect occurrence of the defect.

In a second example, identifying the defect in the magnetic encoder comprises identifying a particular magnet of the plurality of magnets based on the particular magnet having a particular magnetic property that is offset from an expected magnetic property. For example, the particular magnetic property may correspond to any of a magnetic field strength, a magnetic polarization direction, a size, and/or a shape of the particular magnet. For instance, similarly to the example above for the offset mounting position of the particular magnet, other variations of various magnetic properties of the particular magnet can be detected based on a corresponding change to associated given encoder output signals (e.g., outputs from sensor 490 when platform 410 rotates between the first angular position associated with magnet 422 and the second angular position associated with magnet 426).

In a third example, the device includes a magnetic field sensor mounted on a second platform opposite the first platform. In this example, identifying the defect in the magnetic encoder comprises identifying a misalignment between the axis of rotation of the first platform and a normal axis of the second platform. Referring back to FIG. 4A for example, the misalignment may correspond to a scenario where axis 406 of rotation of platform 410 is not perpendicular to surface 430a of platform 430 (e.g., the surface where sensor 490 is mounted as shown in FIG. 4C). In this example, a concentricity of a first magnetic field generated by the plurality of magnets shown in FIG. 4B at the surface 430a relative to axis 406 may be offset from an expected concentricity (e.g., a geometric plane that uniformly intersects the first magnetic field may not be parallel to surface 430a). As a result, measurements of the magnetic field strengths indicated by sensor 490 during each complete rotation may include a sinusoidal measurement error component associated with the offset in the concentricity of the first magnetic field caused by the misalignment between axis 406 and the normal axis of surface 430a where sensor 490 is mounted. In turn, the system of method 500 may identify the offset between axis 406 and the normal axis of surface 430a based on characteristics of the sinusoidal measurement error component indicated by the calibration data, for example.

In some examples, method 1100 involves identifying, based on the calibration data, sinusoidal characteristics of the mapping between the encoder output signals and estimated measurements of the angular positions of the first platform indicated by the given sensor output signals from the orientation sensor.

In a first example, as noted above, the sinusoidal characteristics may indicate a misalignment between the axis of rotation of the first platform and a normal axis of a second platform opposite to the first platform.

In a second example, the sinusoidal characteristics may indicate offsets in the mounting positions of the plurality of magnets on the first platform. For instance, if the actual distances between the magnets shown in FIG. 4B is offset from an expected uniform distance, then sinusoidal measurement errors may result in the output signals of sensor 490 when sensor 490 overlaps regions between two magnets that are not uniformly separated from one another (e.g., as compared to other pairs of magnets that are uniformly separated in the circular arrangement of the magnets). Thus, the sinusoidal characteristic of such measurement errors could be determined in a similar manner as the determination of the sinusoidal characteristic associated with the misalignment of the axis of rotation and the normal axis of the second platform.

In these examples, method 110 may also optionally involve generating a compressed representation of the calibration data (of block 1108) based on the identification of the sinusoidal characteristics; and storing the compressed representation in data storage. For example, a system of method 1100 may compute fast-fourier-transform (FFT) coefficients indicative of the identified sinusoidal characteristics instead of or in addition to storing an uncompressed mapping (e.g., look up table) between values of measurements indicated by the orientation sensor and corresponding values of measurements indicated by the encoder. In this way for instance, the compressed calibration data (e.g., FFT coefficients) can be stored in a reduced memory space (e.g., data storage 214, etc.) and/or can be used to map the encoder output signals with the calibrated angular measurements in a computationally efficient manner.

In some examples, a device of method 1100 may be mounted on a vehicle configured to navigate an environment based on at least data from the device. Referring back to FIG. 1B for example, vehicle 100 may be configured to use device 400 (shown in FIGS. 4A-4D) to measure a yaw direction of vehicle 100 about axis 114. In this example, the vehicle may also include a navigation system (e.g., navigation system 248 of vehicle 200) configured to use the measurement of the yaw direction to navigate the vehicle in the environment (e.g., in an autonomous mode, etc.).

In some examples, method 1100 may involve determining whether the vehicle is moving in the environment; and based on a determination that the vehicle is not moving in the environment, enabling a calibration mode of the device. Further, in these examples, generating the calibration control signal at block 1102 may be based on the calibration mode being enabled. Referring back to FIG. 2 for example, vehicle 200 may include one or more sensors that measure motion of the vehicle (e.g., GPS 226, IMU 228, etc.). Thus, in this example, vehicle 200 may enable the calibration mode if it determines that the vehicle is currently stationary. Additionally or alternatively, for example, the vehicle may enable a sensing mode of the device and/or disable the calibration mode in response to a determination that the vehicle is moving in the environment.

Accordingly, in some examples, method 1100 may involve disabling the calibration mode of the device based on at least a determination that the vehicle is moving in the environment; and/or generating a sensing-mode control signal for controlling the actuator based on the calibration mode being disabled. In these examples, the sensing-mode control signal may cause the actuator to rotate the first platform: (i) along a direction of rotation opposite to a direction of the change to the orientation of the orientation sensor indicated by the sensor output signals, and (ii) at a rate of rotation that is based on the rate of the change to the orientation of the orientation sensor indicated by the sensor output signals. For example, in line with the discussion above, a system of system 1100 may operate the device in the sensing mode by modulating the sensing-mode control signal to reduce the magnitude of measurements by the orientation sensor to drive the first platform against the rotation of the orientation sensor indicated by the sensor output signals. As a result, for example, the system may reduce scale factor errors of measurements indicated by the sensor output signals of the orientation sensor.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:

a platform;

an actuator configured to rotate the platform about an axis;

an encoder configured to provide encoder output signals indicative of angular positions of the platform about the axis;

an orientation sensor mounted on the platform and configured to provide sensor output signals indicative of a rate of change to an orientation of the orientation sensor; and a controller configured to:

operate the device in a sensing mode, wherein operating the device in the sensing mode comprises:

receiving, from the orientation sensor, sensor output signals indicative of a measured rate of change to the orientation of the orientation sensor; and generating a sensing-mode control signal that causes the actuator to rotate the platform about the axis in a direction and a rate of rotation that are based on (i) the measured rate of change to the orientation of the orientation sensor and (ii) a target rate of change to the orientation of the orientation sensor; and operate the device in a calibration mode, wherein operating the device in the calibration mode comprises:

generating a calibration control signal that causes the actuator to rotate the platform about the axis; and determining, based on sensor output signals received from the orientation sensor during the rotation of the platform about the axis, calibration data for mapping the encoder output signals to calibrated measurements of the angular positions of the platform about the axis.

2. The device of claim 1, wherein the calibration control signal causes the actuator to rotate the platform at least one complete rotation about the axis.

3. The device of claim 1, wherein the orientation sensor comprises a gyroscope.

4. The device of claim 1, wherein the device is mounted on a vehicle, and wherein the controller is further configured to determine whether the vehicle is moving.

5. The device of claim 4, wherein the controller is configured to operate the device in the sensing mode based on a determination that the vehicle is moving.

6. The device of claim 4, wherein the controller is configured to operate the device in the calibration mode based on a determination that the vehicle is not moving.

7. The device of claim 1, wherein the encoder is a magnetic encoder.

8. The device of claim 1, wherein the target rate of change to the orientation of the orientation sensor is zero.

9. The device of claim 1, wherein the controller is further configured to:

identify, based on the calibration data, sinusoidal characteristics of the mapping between the encoder output signals and estimated measurements of the angular positions of the first platform indicated by the given sensor output signals;

generate, based on the identified sinusoidal characteristics, a compressed representation of the calibration data; and store the compressed representation in data storage.

10. The device of claim 9, wherein the compressed representation of the calibration data comprises Fast-Fourier-Transform (FFT) coefficients indicative of the identified sinusoidal characteristics.

11. A method comprising:

operating a device in a sensing mode, wherein the device comprises a platform, an actuator configured to rotate the platform about an axis, an encoder configured to provide encoder output signals indicative of angular positions of the platform about the axis, and an orientation sensor mounted on the platform and configured to provide sensor output signals indicative of a rate of change to an orientation of the orientation sensor, wherein operating the device in the sensing mode comprises:

receiving, from the orientation sensor, sensor output signals indicative of a measured rate of change to the orientation of the orientation sensor; and generating a sensing-mode control signal that causes the actuator to rotate the platform about the axis in a direction and a rate of rotation that are based on (i) the measured rate of change to the orientation of the orientation sensor and (ii) a target rate of change to the orientation of the orientation sensor; and operating the device in a calibration mode, wherein operating the device in the calibration mode comprises:

generating a calibration control signal that causes the actuator to rotate the platform about the axis; and determining, based on sensor output signals received from the orientation sensor during the rotation of the platform about the axis, calibration data for mapping the encoder output signals to calibrated measurements of the angular positions of the platform about the axis.

12. The method of claim 11, wherein the device is mounted on a vehicle further comprising:

determining whether the vehicle is moving.

13. The method of claim 12, wherein operating the device in the sensing mode comprises:

operating the device in the sensing mode based on a determination that the vehicle is moving.

14. The method of claim 12, wherein operating the device in the calibration mode comprises:

operating the device in the calibration mode based on a determination that the vehicle is not moving.

15. The method of claim 11, wherein the encoder is a magnetic encoder, further comprising:

identifying a defect in the magnetic encoder based on the calibration data.

16. The method of claim 15, wherein the magnetic encoder includes a plurality of magnets mounted to the platform and arranged around the axis of rotation of the platform, and wherein identifying the defect in the magnetic encoder comprises identifying a particular magnet of the plurality of magnets that is positioned at an offset from an expected position of the particular magnet in the arrangement of the plurality of magnets around the axis of rotation.

17. The method of claim 15, wherein the magnetic encoder includes a plurality of magnets mounted to the platform and arranged around the axis of rotation of the platform, and wherein identifying the defect in the magnetic encoder comprises identifying a particular magnet of the plurality based on the particular magnet having a particular magnetic property that is offset from an expected magnetic property.

18. The method of claim 17, wherein the particular magnetic property corresponds to a magnetic field strength, a magnetic polarization direction, a size, or a shape of the particular magnet.

19. The method of claim 15, wherein the magnetic encoder includes a plurality of magnets mounted to the platform and arranged around the axis of rotation of the platform, and wherein identifying the defect in the magnetic encoder comprises identifying an offset between a circularity of the arrangement of the plurality of magnets around the axis of rotation and an expected circularity.

20. The method of claim 15, wherein the platform is a first platform, wherein the magnetic encoder includes a plurality of magnets mounted to the first platform and arranged around the axis of rotation of the first platform, wherein the magnetic encoder includes a magnetic field sensor mounted on a second platform opposite the first platform, and wherein identifying the defect in the magnetic encoder comprises identifying a misalignment between the axis of rotation of the first platform and a normal axis of the second platform.

* * * * *